US012223734B2

(12) United States Patent
Tu et al.

(10) Patent No.: US 12,223,734 B2
(45) Date of Patent: Feb. 11, 2025

(54) SYSTEMS AND METHODS FOR TRAINING MACHINE-LEARNED MODELS WITH DEVIATING INTERMEDIATE REPRESENTATIONS

(71) Applicant: Aurora Operations, Inc., Pittsburgh, PA (US)

(72) Inventors: Xuanyuan Tu, Milton (CA); Raquel Urtasun, Toronto (CA); Tsun-Hsuan Wang, Cambridge (CA); Sivabalan Manivasagam, Toronto (CA); Jingkang Wang, Toronto (CA); Mengye Ren, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 982 days.

(21) Appl. No.: 17/151,001

(22) Filed: Jan. 15, 2021

(65) Prior Publication Data
US 2021/0279640 A1 Sep. 9, 2021

Related U.S. Application Data

(60) Provisional application No. 63/132,780, filed on Dec. 31, 2020, provisional application No. 62/985,865, filed on Mar. 5, 2020.

(51) Int. Cl.
*G06V 20/56* (2022.01)
*G01S 17/931* (2020.01)
(Continued)

(52) U.S. Cl.
CPC ............ *G06V 20/56* (2022.01); *G01S 17/931* (2020.01); *G05D 1/0088* (2013.01);
(Continued)

(58) Field of Classification Search
CPC .. G01S 17/931; G05D 1/0088; G05D 1/0221; G05D 1/00791; G05D 2201/0213;
(Continued)

(56) References Cited

U.S. PATENT DOCUMENTS 10,664,722 B1 * 5/2020 Sharma ............... G06F 18/2431
11,010,907 B1 * 5/2021 Bagwell ............... G05D 1/0221
(Continued)

OTHER PUBLICATIONS

Gindele, Tobias, Sebastian Brechtel, and Rudiger Dillmann. "Learning driver behavior models from traffic observations for decision making and planning." IEEE Intelligent Transportation Systems Magazine 7.1 (2015): 69-79. (Year: 2015).*
(Continued)

*Primary Examiner* — Kamran Afshar
*Assistant Examiner* — Randy K Baldwin
(74) *Attorney, Agent, or Firm* — Dority & Manning, P.A.

(57) ABSTRACT

Systems and methods for vehicle-to-vehicle communications are provided. An adverse system can obtain sensor data representative of an environment proximate to a targeted system. The adverse system can generate an intermediate representation of the environment and a representation deviation for the intermediate representation. The representation deviation can be designed to disrupt a machine-learned model associated with the target system. The adverse system can communicate the intermediate representation modified by the representation deviation to the target system. The target system can train the machine-learned model associated with the target system to detect the modified intermediate representation. Detected modified intermediate representations can be discarded before disrupting the machine-learned model.

20 Claims, 11 Drawing Sheets

(51) Int. Cl.
  *G05D 1/00* (2024.01)
  *G06F 18/21* (2023.01)
  *G06F 18/24* (2023.01)
  *G06N 20/00* (2019.01)
  *G06V 10/764* (2022.01)
  *G06V 10/82* (2022.01)

(52) U.S. Cl.
  CPC ....... *G05D 1/0221* (2013.01); *G06F 18/2163* (2023.01); *G06F 18/217* (2023.01); *G06F 18/24* (2023.01); *G06N 20/00* (2019.01); *G06V 10/764* (2022.01); *G06V 10/82* (2022.01)

(58) Field of Classification Search
  CPC .... G06N 20/00; G06K 9/6261; G06K 9/6262; G06K 9/6267
  See application file for complete search history.

(56) References Cited

U.S. PATENT DOCUMENTS

| | | | |
|---|---|---|---|
| 2018/0130324 A1* | 5/2018 | Yu | G08B 13/19697 |
| 2018/0272963 A1* | 9/2018 | Meyhofer | B60W 50/023 |
| 2019/0049987 A1* | 2/2019 | Djuric | G06N 3/08 |
| 2020/0174490 A1* | 6/2020 | Ogale | G06N 3/045 |
| 2020/0201351 A1* | 6/2020 | Armstrong-Crews | G05D 1/0088 |
| 2021/0037044 A1* | 2/2021 | Achanta | H04L 43/12 |
| 2021/0157912 A1* | 5/2021 | Kruthiveti Subrahmanyeswara Sai | G06F 21/554 |
| 2022/0126864 A1* | 4/2022 | Moustafa | G06T 1/0007 |

OTHER PUBLICATIONS

Hubschneider, Christian, et al. "Integrating end-to-end learned steering into probabilistic autonomous driving." 2017 IEEE 20th International Conference on Intelligent Transportation Systems (ITSC). IEEE, 2017. (Year: 2017).*
Drews, Paul, et al. "Aggressive deep driving: Model predictive control with a cnn cost model." arXiv preprint arXiv:1707.05303 (2017): 1-11 (Year: 2017).*
Liu, Yanpei, et al. "Delving into transferable adversarial examples and black-box attacks." arXiv preprint arXiv:1611.02770 v3 (2017): 1-24 (Year: 2017).*
Amini, Alexander, et al. "Variational autoencoder for end-to-end control of autonomous driving with novelty detection and training de-biasing." 2018 IEEE/RSJ International Conference on Intelligent Robots and Systems (IROS). IEEE, 2018: 568-575 (Year: 2018).*
Cao, Yulong, et al. "Adversarial sensor attack on lidar-based perception in autonomous driving." Proceedings of the 2019 ACM SIGSAC conference on computer and communications security. 2019: 2267-2281 (Year: 2019).*
Qayyum, Adnan, et al. "Securing Connected & Autonomous Vehicles: Challenges Posed by Adversarial Machine Learning and The Way Forward." arXiv preprint arXiv:1905.12762 (2019): 1-29 (Year: 2019).*
Deng, Yao, et al. "An Analysis of Adversarial Attacks and Defenses on Autonomous Driving Models." arXiv preprint arXiv:2002.02175 (Feb. 6, 2020). (Year: 2020).*
Yang, Luona, et al. "Real-to-virtual domain unification for end-to-end autonomous driving." Proceedings of the European conference on computer vision (ECCV). 2018. (Year: 2018).*
Ilievski, Marko, et al. "Design space of behaviour planning for autonomous driving." arXiv preprint arXiv:1908.07931 (2019). (Year: 2019).*
Bonawitz et al., "Towards Federated Learning at Scale: System Design", arXiv:1902.01046v2, Mar. 22, 2019, 15 pages.
Boreselius, "Mobile agent security", Electronics and Communication Engineering Journal, vol. 14, No. 5, Aug. 2002, 11 pages.
Brendel et al., "Decision-Based Adversarial Attacks: Reliable Attacks Against Black-Box Machine Learning Models", International Conference on Learning Representations, Apr. 30-May 3, 2018, Vancouver, Canada, 12 pages.
Brunner et al., "Guessing Smart: Biased Sampling for Efficient Black-Box Adversarial Attacks", arXiv:1812.09803v3, May 5, 2019.
Cao et al., "Adversarial Sensor Attack on LiDAR-based Perception in Autonomous Driving", ACM Conference on Computer and Communications Security, Nov. 11-15, 2019, London, UK, pp. 2267-2281.
Carlini et al., "Towards Evaluating the Robustness of Neural Networks", IEEE Symposium on Security and Privacy, May 22-25, 2017, San Jose, CA, 19 pages.
Chen et al., "Cooper: Cooperative Perception for Connected Autonomous Vehicles based on 3D Point Clouds", IEEE $39^{th}$ International Conference on Distributed Computing Systems, Jul. 7-9, 2019, Dallas, TX, pp. 514-524.
Chen et al., "HopSkipJumpAttack: A Query-Efficient Decision-Based Attack", arXiv:1904.02144v3, Jun. 10, 2019, 26 pages.
Chen et al., "ZOO: Zeroth Order Optimization Based Black-box Attacks to Deep Neural Networks without Training Substitute Models", ACM SIGSAC Conference on Computer and Communications Security, Nov. 3, 2017, Dallas, TX, pp. 15-26.
Cheng et al., "Improving Black-box Adversarial Attacks with a Transfer-based Prior", Conference on Neural Information Processing Systems, Dec. 8-14, 2019, Vancouver, Canada, 11 pages.
Cheng et al., "Query-Efficient Hard-Label Black-Box Attack: An Optimization-Based Approach", International Conference on Learning Representations, May 6-9, 2019, New Orleans, LA, 14 pages.
Cheng et al., "Seq2Sick: Evaluating the Robustness of Sequence-to-Sequence Models with Adversarial Examples", arXiv:1803.01128v1, Mar. 3, 2018, 16 pages.
Dillon et al., "Cloud Computing: Issues and Challenges", IEEE International Conference on Advanced Information Networking and Applications, Apr. 20-23, 2010, Perth, Western Australia, pp. 27-33.
Dong et al., "Boosting Adversarial Attacks with Momentum", Conference on Computer Vision and Pattern Recognition, Jun. 18-22, 2018, Salt Lake City, UT, pp. 9185-9193.
Eshratifar et al., "Energy and Performance Efficient Computation Offloading for Deep Neural Networks in a Mobile Cloud Computing Environment", ACM Great Lakes Symposium on VLSI, May 23-25, 2018, Chicago, Illinois, pp. 111-116.
Gil et al., "White-to-Black: Efficient Distillation of Black-Box Adversarial Attacks", arXiv:1904.02405v1, Apr. 4, 2019, 7 pages.
Goodfellow et al., "Explaining and Harnessing Adversarial Examples", arXiv:1412.6572v3, Mar. 20, 2015, 11 pages.
Heusel et al., "GANs Trained by a Two Time-Scale Update Rule Converge to a Local Nash Equilibrium", Conference on Neural Information Processing Systems, Dec. 4-9, 2017, Long Beach, CA 12 pages.
Huang et al., "Adversarial Attacks on Neural Network Policies", 5th International Conference on Learning Representations, Apr. 24-26, 2017, Toulon, France, 7 pages.
Huang et al., "Enhancing Adversarial Example Transferability with an Intermediate Level Attack", arXiv:1907.10823v2, Oct. 6, 2019, 20 pages.
Ilyas et al., "Black-box Adversarial Attacks with Limited Queries and Information", International Conference on Machine Learning, Jul. 10-15, 2018, Stockholm, Sweden, 10 pages.
Jiang et al., "Black-box Adversarial Attacks on Video Recognition Models", ACM Multimedia, Oct. 21-25, 2019, Nice, France, pp. 864-872.
Konecny et al., "Federated Learning: Strategies for Improving Communication Efficiency", arXiv:1610.05492v1, Oct. 18, 2016, 5 pages.
Liu et al., "Delving into Transferable Adversarial Examples and Black-Box Attacks", 5th International Conference on Learning Representations, Apr. 24-26, 2017, Toulon, France, 14 pages.
Madry et al., "Towards Deep Learning Models Resistant to Adversarial Attacks", arXiv:1706.06083v3, Nov. 9, 2017, 27 pages.

(56) References Cited

OTHER PUBLICATIONS

Manivasagam et al., "LiDARsim: Realistic LiDAR Simulation by Leveraging the Real World", Conference on Computer Vision and Pattern Recognition, Jun. 14-19, 2020, Virtual, pp. 11167-11176.
Miyato et al., "Spectral Normalization for Generative Adversarial Networks", arXiv:1802.05957v1, Feb. 16, 2018, 26 pages.
Nakamoto, "Bitcoin: A Peer-to-Peer Electronic Cash System", https://bitcoin.org/bitcoin.pdf?, 2019, 9 pages.
Novak et al., "Communication Security in Multi-agent Systems", CEEMAS Lecture Notes in Computer Science, vol. 2691, 2003, pp. 454-463.
Obst et al., "Multi-Sensor Data Fusion for Checking Plausibility of V2V Communications by Vision-based Multiple-Object Tracking", Dec. 3-5, 2014, Paderborn, Germany, pp. 143-150.
Papernot et al., "Crafting Adversarial Input Sequences for Recurrent Neural Networks", The 35th Military Communications Conference (MILCOM 2016), Nov. 1-3, 2016, Baltimore, MD, 6 pages.
Papernot et al., "Practical Black-Box Attacks against Machine Learning", Asia CCS, Apr. 2-6, 2017, Abu Dhabi, United Arab Emirates, pp. 506-519.
Rauch et al., "Car2X-Based Perception in a High-Level Fusion Architecture for Cooperative Perception Systems", 2012 Intelligent Vehicles Symposium, Jun. 3-7, 2012, Alcala, Spain, pp. 270-275.
Rawashdeh et al., "Collaborative Automated Driving: A Machine Learning-based Method to Enhance the Accuracy of Shared Information", 21st International Conference on Intelligent Transportation Systems (ITSC), Nov. 4-7, 2018, Maui, Hawaii, pp. 3961-3966.
Rockl et al., "V2V Communications in Automotive Multi-sensor Multi-target Tracking", 68th IEEE Vehicular Technology Conference, Sep. 21-24, 2008, Calgary, Canada, 5 pages.
Sato et al., "Interpretable Adversarial Perturbation in Input Embedding Space for Text", International Joint Conference on Artificial Intelligence, Jul. 13-19, 2018, Stockholm, Sweden, pp. 4323-4330.
Szegedy et al., "Intriguing properties of neural networks", 2nd International Conference on Learning Representations, ICLR 2014, Apr. 14-16, 2014, Banff, AB, Canada, 9 pages.
Tramer et al., "Ensemble Adversarial Training: Attacks and Defenses", Sixth International Conference on Learning Representations, Apr. 30-May 3, 2018, Vancouver, Canada, 20 pages.
Tu et al., "Physically Realizable Adversarial Examples for LiDAR Object Detection", arXiv:2004.00543v2, Apr. 2, 2020, 10pages.
Wang et al., "V2VNet: Vehicle-to-Vehicle Communication for Joint Perception and Prediction", arXiv:2008.07519v1, Aug. 17, 2020, 17 pages.
Wei et al., "Sparse Adversarial Perturbations for Videos", Thirty-Third AAAI Conference on Artificial Intelligence (AAAI-19), Jan. 27-Feb. 1, 2019, Honolulu, Hawaii, pp. 8973-8980.
Wong et al., "Adding Security and Trust to Multiagent Systems", Applied Artificial Intelligence, vol. 14, 2000, pp. 927-941.
Wu et al., "Adversarial Training for Relation Extraction", Conference on Empirical Methods in Natural Language Processing 2017 (EMNLP), Sep. 7-11, 2017, Copenhagen, Denmark, 6 pages.
Xie et al., "Adversarial Examples for Semantic Segmentation and Object Detection", International Conference on Computer Vision, Oct. 22-29, 2017, Venice, Italy, pp. 1369-1378.
Xie et al., "Improving Transferability of Adversarial Examples with Input Diversity", Conference on Computer Vision and Pattern Recognition, Jun. 16-20, 2019, Long Beach, CA, pp. 2730-2739.
Zeng et al., "Wireless Communications and Control for Swarms of Cellular-Connected UAVs", Asilomar Conference on Signals, Systems, and Computers, Oct. 28-31, 2018, Pacific Grove, CA, pp. 719-723.
Zhang et al., "Adversarial Attacks on Deep Learning Models in Natural Language Processing: A Survey", arXiv:1901.06796v3, Apr. 11, 2019, 40 pages.
Zhu et al., "FreeLB: Enhanced Adversarial Training for Natural Language Understanding", Eighth International Conference on Learning Representations, Apr. 26-May 1, 2020, Virtual, 14 pages.

* cited by examiner

SYSTEMS AND METHODS FOR TRAINING MACHINE-LEARNED MODELS WITH DEVIATING INTERMEDIATE REPRESENTATIONS

RELATED APPLICATION

The present application is based, at least in part, on and claims benefit of U.S. Provisional Patent Application No. 63/132,780 having a filing date of Dec. 31, 2020 and U.S. Provisional Patent Application No. 62/985,865 having a filing date of Mar. 5, 2020, both of which are incorporated by reference herein.

FIELD

The present disclosure relates generally to performing autonomous vehicle operations. In particular, the present disclosure relates to training machine-learned model for performing autonomous vehicle operations.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for vehicle-to-vehicle communications. The method includes obtaining, by a computing system including one or more computing devices, sensor data representative of a secondary environment proximate to an autonomous vehicle. The method includes generating, by the computing system, an intermediate representation for the autonomous vehicle based, at least in part, on the sensor data. The intermediate representation can be descriptive of at least a portion of the secondary environment. The method includes determining, by the computing system, an intermediate representation deviation for the intermediate representation based, at least in part, on the intermediate representation and a machine-learned model associated with the autonomous vehicle. The method includes generating, by the computing system, data indicative of a modified intermediate representation based, at least in part, on the intermediate representation and the intermediate representation deviation. And, the method includes communicating, by the computing system, the data indicative of the modified intermediate representation to a vehicle computing system associated with the autonomous vehicle.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining a plurality of intermediate representations associated with an autonomous vehicle. Each intermediate representation can be descriptive of at least a portion of a secondary environment proximate to the autonomous vehicle at a plurality of times. The operations include generating a surrogate machine-learned model based, at least in part, on the plurality of intermediate representations. The operations include obtaining a target intermediate representation from the plurality of intermediate representations. The operations include determining an intermediate representation deviation for the target intermediate representation based, at least in part, on the target intermediate representation and the surrogate machine-learned model. The operations include generating data indicative of a modified intermediate representation based, at least in part, on the target intermediate representation and the intermediate representation deviation. The operations include communicating the data indicative of the modified intermediate representation to a vehicle computing system associated with the autonomous vehicle.

Another example aspect of the present disclosure is directed to an autonomous vehicle. The autonomous vehicle includes one or more sensors, one or more processors, and one or more tangible, non-transitory, computer readable media that collectively store instructions that when executed by the one or more processors cause the one or more processors to perform operations. The operations include obtaining, via the one or more sensors, sensor data representative of a surrounding environment of the autonomous vehicle. The operations include generating, via a first portion of a machine-learned model, an intermediate representation based, at least in part, on the sensor data. The intermediate representation can be descriptive of at least a portion of the surrounding environment of the autonomous vehicle. The operations include determining an intermediate representation deviation for the intermediate representation based, at least in part, on the intermediate representation and the machine-learned model. The operations include generating, data indicative of a modified intermediate representation based, at least in part, on the intermediate representation and the intermediate representation deviation. The operations include communicating the data indicative of the modified intermediate representation to one or more devices associated with a target autonomous vehicle.

Other example aspects of the present disclosure are directed to systems, methods, vehicles, apparatuses, tangible, non-transitory computer-readable media, and memory devices for training machine-learned models.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
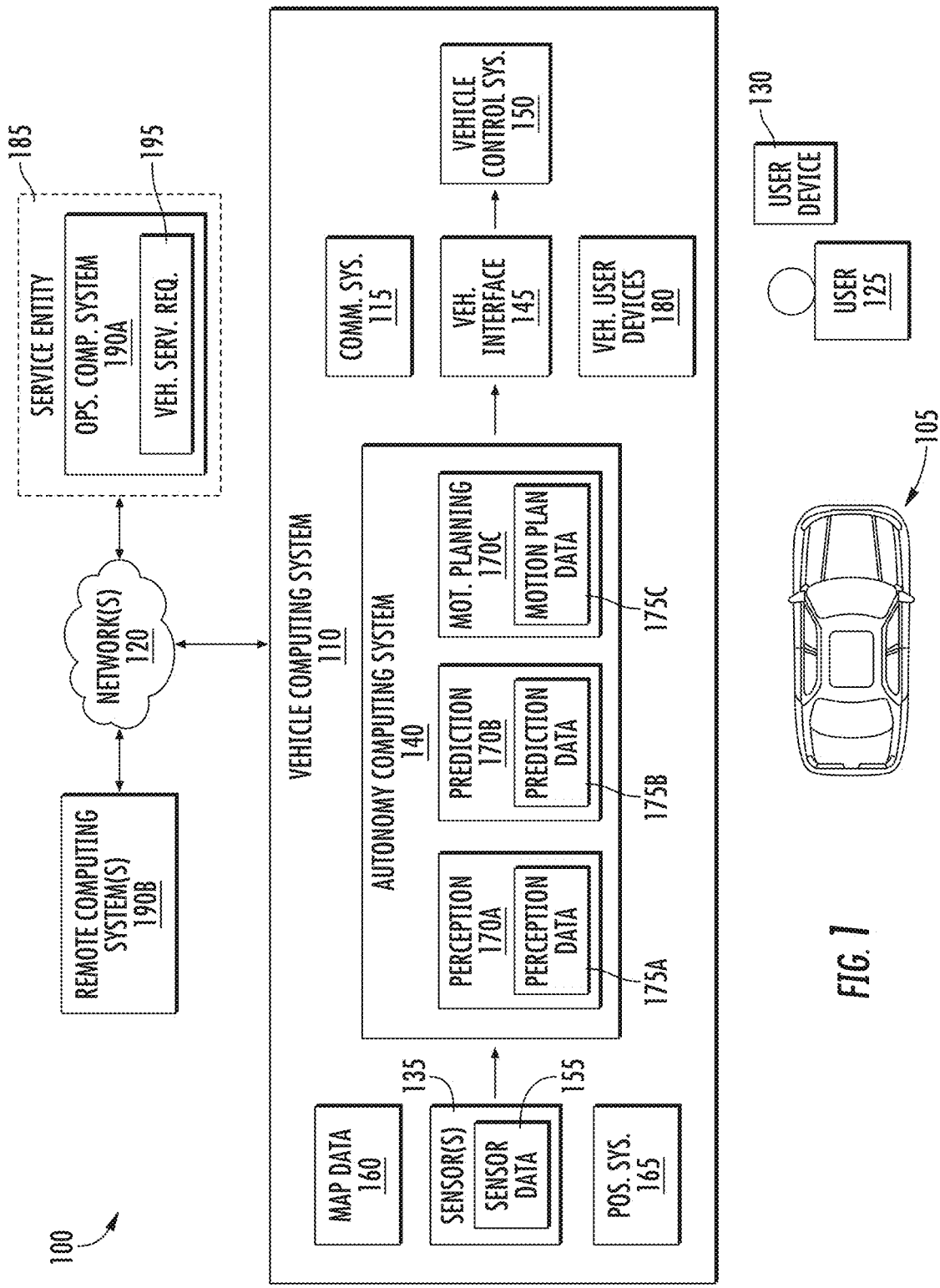
FIG. 1 depicts a block diagram of an example system for an autonomous vehicle according to example embodiments of the present disclosure.

Aspects of the present disclosure are directed to improved systems and methods for training machine-learned models with deviating intermediate representations received during communications among autonomous vehicles and/or other systems. More particularly, communication technology of the present disclosure allows autonomous vehicles and/or other systems to share intermediate feature representations and intelligently aggregate this information to improve autonomous vehicle/system operations. For instance, a first autonomous vehicle can obtain sensor data (e.g., Light Detection and Ranging (LIDAR) data, etc.) indicative of the vehicle's surrounding environment. The first autonomous vehicle can generate an intermediate representation (e.g., an encoded feature map, etc.) based, at least in part, on the sensor data (e.g., voxelized LIDAR data). A second autonomous vehicle can receive the intermediate representation and utilize the intermediate representation to improve its autonomous operations. For instance, the second autonomous vehicle (e.g., the recipient vehicle) can utilize a machine-learned aggregation model to generate an updated intermediate representation based, at least in part, on the intermediate representation. The updated intermediate representation can pool information detected by sensors of both the first and second vehicles. In this way, the updated intermediate representation can be input into a machine-learned model (e.g., a joint machine-learned perception and prediction model) at the second autonomous vehicle to identify objects detected by the first, second, or both vehicles. This can lead to more accurate estimates of an object's position, size, and shape, as well as the predicted future trajectory of the object and improve the ability of the second autonomous vehicle to safely plan its motion though its environment.

These advantages can rely on communication channels that may potentially be vulnerable to security breaches. Aspects of the present disclosure are directed to improved systems and methods for training machine-learned models to detect and mitigate adversarial attacks via communication channels between autonomous vehicles and other systems (e.g., other vehicles, etc.). More particularly, a computing system can obtain sensor data representative of an environment proximate to an autonomous vehicle. The computing system can generate an intermediate representation (e.g., via a portion of a machine-learned model used by the autonomous vehicle, a surrogate machine-learned model mirroring the functionality of the machine-learned model used by the autonomous vehicle, etc.) based, at least in part on, on the sensor data and determine an intermediate representation deviation (e.g., noise on top of the intermediate representation) for the intermediate representation. The intermediate representation deviation can be applied to the intermediate representation to generate a modified intermediate representation. The modified intermediate representation can be learned to cause false positives, false negatives, poor localizations, and/or any other defects with an autonomy output of a machine-learned model utilized by the autonomous vehicle to perceive its environment. The modified intermediate representation can be communicated to the autonomous vehicle (and/or a vehicle computing system thereof) and the machine-learned model can be trained (via adversarial training techniques) to differentiate between the modified (e.g., malicious) intermediate representation and unmodified (e.g., bonafide) intermediate representations. In this way, machine-learned models can be trained to defend against data augmentation at the communication and intermediate representation level. This, in turn, provides an improvement to computing technology by increasing the security of inter-system collaboration, thereby increasing the speed, efficiency, and reliability of estimating an object's position, size, and shape using knowledge provided by third-parties (e.g., other vehicles, etc.).

The following describes the technology of this disclosure within the context of autonomous vehicles for example purposes only. As described herein, the technology is not limited to an autonomous vehicle setting and can be implemented within other robotic and/or computing systems, such as those utilizing object detection and/or prediction machine-learned models. Moreover, the technology of this disclosure can be described, at time, within the context of vehicle-to-vehicle communications for example purposes only. The technology can be utilized by a variety of types of computing systems that may communicate with other computing systems of the same or different type. By way of example, a ground-based autonomous vehicle, aerial-based autonomous vehicle, or any other robotic system can utilize the technology described herein for communicating with another type of vehicle (e.g., ground vehicle, aerial vehicle, etc.) and/or an infrastructure element (e.g., a stationary sensor suite on a building, traffic light, etc.).

An autonomous vehicle can include an onboard vehicle computing system with a variety of components for operating with minimal and/or no interaction from a human operator. For example, the computing system can be located onboard the autonomous vehicle and include one or more sensors (e.g., cameras, LIDAR, Radio Detection and Ranging (RADAR), etc.), an autonomy computing system (e.g., for determining autonomous navigation), one or more vehicle control systems (e.g., for controlling braking, steering, powertrain), etc.

The vehicle computing system (e.g., the autonomy computing system) can include sub-systems that cooperate to perceive the surrounding environment of the autonomous vehicle and determine a motion plan for controlling the motion of the autonomous vehicle. For example, the vehicle computing system can include a joint perception and prediction system configured to perceive object(s) within the surrounding environment of the autonomous vehicle and to predict motion of the object(s) within the surrounding environment of the autonomous vehicle. In some implementations, the vehicle computing system can separate these perception and prediction functions into separate systems. The vehicle computing system can include a motion planning system configured to plan the motion of the autonomous vehicle with respect to the object(s) within the surrounding environment of the autonomous vehicle.

Autonomous vehicles can operate within geographic areas or have operating domains that can include other autonomous vehicles and/or infrastructure elements (e.g., infrastructure systems, etc.). For example, a plurality of autonomous vehicles can be located within a geographic area. The geographic area can include one or more travel ways (e.g., roadways, etc.) and one or more geographic features (e.g., cross walks, lane boundaries, etc.). In some implementations, the geographic area can include infrastructure elements that include computing systems with communication technology capable of communicating with one or more of the autonomous vehicles within the geographic area, as further described herein. The geographic area can also include one or more objects. The objects can include, for example, static object(s) (e.g., lampposts, parking meters, etc.) and/or dynamic actor objects (e.g., pedestrians, vehicles, bicycles/bicyclists, etc.) that are and/or may be in motion.

Each of the plurality of autonomous vehicles can include a communication system that allows the respective vehicle's computing system to communicate with system(s) that are remote from the autonomous vehicle. For example, an autonomous vehicle can utilize its communication system to send and receive messages (e.g., via an internet connection) from a cloud-based server system that helps support the autonomous vehicle. This can include, for example, an offboard service assignment system and routing system that matches the autonomous vehicle to a request for a vehicle service (e.g., rideshare service) and provides the autonomous vehicle with a route for completing the vehicle service. Each autonomous vehicle can also have a communication range that allows the autonomous vehicle to communicate with computing systems nearby the autonomous vehicle.

For example, an autonomous vehicle can have a communication range that is based at least in part on the vehicle's communication hardware (e.g., antenna, etc.) and the communication protocol utilized by the autonomous vehicle. The communication range can be represented by a radial distance from the autonomous vehicle. The autonomous vehicle can communicate to an ecosystem of autonomous vehicles (and/or other devices/systems) within the communication range. For example, the autonomous vehicle can communicate data to a second, different autonomous vehicle that is within the communication range of the autonomous vehicle. In this way, an ecosystem of autonomous vehicles and related systems (operations systems, third party systems, etc.) can communicate to improve a vehicles' autonomous operations. As described herein, such communications may potentially be susceptible to malicious attacks designed to degrade the autonomous performance of the vehicles. The systems and methods of the present disclosure expose these vulnerabilities such that machine-learned models (e.g., joint perception and prediction models) can be trained to identify and proactively handle malicious behavior.

To do so, a computing system (e.g., an operations computing system, a transmitting vehicle computing system, etc.) can obtain sensor data representative of an environment proximate to an autonomous vehicle (e.g., a target autonomous vehicle). For example, the environment can be a secondary environment associated with the target autonomous vehicle. By way of example, the secondary environment can be an environment surrounding an entity (e.g., aerial vehicle (e.g., drone, etc.), ground vehicle (autonomous ground vehicle, etc.), stationary object (e.g., traffic light, etc.), etc.) that is located proximate to the target autonomous vehicle. As one example, the computing system can include a vehicle computing system onboard another autonomous vehicle (e.g., a transmitting autonomous vehicle) located proximate to the target autonomous vehicle. The transmitting autonomous vehicle (e.g., its onboard vehicle computing system) can obtain sensor data, via one or more sensor(s) of the vehicle computing system, associated with a surrounding environment (e.g., a secondary environment proximate to the target autonomous vehicle) of the transmitting autonomous vehicle.

The sensor data can include one or more types of sensor data associated with one or more sensor modalities. For example, the sensor data can include three-dimensional point cloud data (e.g., LIDAR point cloud data). In some implementations, the sensor data can include a fusion of different types of sensor data. For example, the sensor data can include a first type of sensor data (e.g., camera image data) associated with a first sensor modality (e.g., stereo camera) and a second type of sensor data (e.g., LIDAR data) associated with a second sensor modality (e.g., LIDAR system). In some implementations, the sensor data can include data acquired by multiple different computing systems (e.g., one or more autonomous vehicles, infrastructure elements, etc.). As an example, the sensor data can include a first set of sensor data (e.g., a first set of LIDAR data) acquired by a transmitting autonomous vehicle and a second set of sensor data (e.g., a second set of LIDAR data) that was acquired by another autonomous vehicle in its ecosystem and sent to the transmitting autonomous vehicle.

The computing system (e.g., operations computing system, transmitting autonomous vehicle computing system, etc.) can generate an intermediate representation for use by another autonomous vehicle (e.g., target autonomous vehicle). The intermediate representation can be generated based, at least in part, on the sensor data and can be descriptive of at least a portion of the secondary environment. As one example, a transmitting autonomous vehicle can determine an intermediate representation of at least a portion of the surrounding environment of the transmitting autonomous vehicle based at least in part on the sensor data.

The intermediate representation can include a feature map indicative of at least a portion of the secondary environment. This portion of the secondary environment can be, for example, a portion of the computing system's (and/or associated device(s)) environment that can be captured within the sensor's field of view (or a portion thereof) and represented in the sensor data. To determine the intermediate representation, the computing system can generate voxelized sensor data by voxelizing the three-dimensional point cloud data of the sensor data. By way of example, the computing system can extract raw features from its LIDAR sensor data and transform them into a bird's eye view (BEV). The features can include, for example, a heading and/or shape of an object indicated in the intermediate representation. The computing system can voxelize the LIDAR point clouds (e.g., in 15 cm$^3$, etc.), apply several convolutional layers, and output feature maps of shape H×W×C, where H×W denotes the scene range in BEV, and C is the number of feature channels.

The intermediate representation can be generated based, at least in part, on a machine-learned model (e.g., a joint perception and prediction model) associated with the target autonomous vehicle. The machine-learned model associated with the target autonomous vehicle can include a machine-learned model utilized by a target vehicle computing system of the target autonomous vehicle to perceive (e.g., identify) one or more objects within its surrounding environment and/or predict the motion of the one or more objects. The computing system can generate the intermediate representation, via a first portion of the machine-learned model (e.g., a convolutional neural network, etc.), based, at least in part, on the sensor data. The first portion, for example, can include one or more convolutional layers of the machine-learned model. For instance, the computing system can input the voxelized sensor data into the machine-learned model. The machine-learned model can be configured to apply one or more convolutional layers to the voxelized sensor data. For example, the machine-learned model can utilize a plurality of layers (e.g., three layers, etc.) of 3×3 convolution filters (e.g., with strides of 2, 1, 2 respectively) to produce the intermediate representation. The intermediate representation can be, for example, a 4× down sampled spatial feature map. The feature map can be represented as a matrix generated from the array(s) of the sensor data. The computing system can receive the intermediate representation (e.g., an activation of intermediate neural network layers, etc.) as an output of the first portion (e.g., one or more first (e.g., intermediate) neural network layers) of the machine-learned model.

The computing system can determine an intermediate representation deviation for the intermediate representation. The intermediate representation deviation can include one or more perturbations that can be applied to the intermediate representation. For example, as discussed in further detail herein, the intermediate representation deviation can include deviations to the intermediate representation designed to cause false positives, false negatives, and/or poor localization results by the target machine-learned model utilized by the target autonomous vehicle for autonomous functionalities (e.g., object detection, prediction, motion planning, etc.).

As an example, a target vehicle computing system (e.g., of a target autonomous vehicle) can generate an autonomy output based at least in part on one or more of received intermediate representations received from a number of other systems (e.g., the computing system described herein, a transmitting autonomous vehicle, etc.). The autonomy output can be indicative of one or more bounding box proposals indicative of one or more objects within the surrounding environment of the target autonomous vehicle based, at least in part, on the one or more intermediate representations. As an example, the autonomy output can be indicative of a bounding shape associated with an object within the environment of the target autonomous vehicle and/or one or more predicted future locations of the object. In some implementations, to generate the autonomy output, the vehicle computing system can utilize a machine-learned model (and/or portion thereof) such as, for example, a second portion of the machine-learned model (e.g., the joint perception and prediction model) utilized to generate the intermediate representations. The machine-learned model (and/or portion thereof) can be configured to generate the autonomy output(s). For example, the machine-learned model can be configured to output the one or more bounding box proposals indicative of the one or more objects within the surrounding environment of the target autonomous vehicle based, at least in part, on one or more intermediate representations.

By way of example, the autonomy output Z can include a set of M bounding box proposals $z^{(1)}, \ldots, z^{(M)}$ at different spatial locations. Each proposal can consist of class scores $z_{\sigma_0}, \ldots, z_{\sigma_k}$ and bounding box parameters describing the spatial location and dimensions of the bounding box. For instance, classes $0, \ldots, k-1$ can include object classes and k can include background classes where no objects are detected. The machine-learned model can be trained to predict the correct object class k and maximize the ratio of intersection over union (IOU) of proposed and ground truth bounding boxes. In post processing steps, bounding box proposals with high confidence can be selected and overlapping bounding boxes can be filtered with non-maximum suppression (NMS) to produce a single estimate per ground truth object.

The machine-learned model can include an object detection model, perception model, prediction model, and/or a joint perception and prediction model. The model can include several memories, networks, and/or layers (neural network layers, convolutional layers, etc.). For example, the model can include a plurality of network branches (e.g., a branch for perception, a branch for prediction, etc.), a plurality of memories (e.g., an appearance memory, object path memory, etc.) as well as an object path proposal network and/or a path refinement network. The machine-learned model can include any number of duplicate models distributed among one or a plurality of autonomous vehicles and/or other computing systems. For example, a first machine-learned model can be included on and/or utilized by a target vehicle computing system (and/or autonomous vehicle thereof) and a second machine-learned model can be included on and/or utilized by the computing system (e.g., a transmitting autonomous vehicle, an operations computing system, an infrastructure element, etc.). The first machine-learned model and the second machine-learned model can include two versions (e.g., copies, etc.) of the same machine-learned model.

The computing system can determine the intermediate representation deviation for the intermediate representation based, at least in part, on the intermediate representation and the machine-learned model (e.g., a second portion of the machine-learned model used to generate the intermediate representation) associated with the target autonomous vehicle. For example, the intermediate representation deviation can be tailored to the machine-learned model. As an example, the intermediate representation deviation can include one or more deviations that, when applied to the intermediate representation, cause the machine-learned model to output inaccurate autonomy output. The inaccurate autonomy output, for example, can include one or more bounding box proposals with inaccurate class scores (e.g., false negatives, false positives, etc.), dimensions, and/or spatial location (e.g., false localization, etc.). The intermediate representation deviation can be constrained such that an intermediate representation modified by the intermediate representation deviation can be indistinguishable to the machine-learned model (e.g., without the training techniques described herein). For example, the intermediate representation deviation δ can be constrained by $\|\delta\|_\infty \leq \epsilon$, to ensure that the modified intermediate representation is subtle and difficult to detect.

The computing system can determine the intermediate representation deviation by comparing a ground truth autonomy output generated based, at least in part, on the intermediate representation to a deviating autonomy output generated based, at least in part, on an intermediate representation modified by an initial intermediate representation deviation. For example, the computing system can obtain, via a second machine-learned model (e.g., a copy or surrogate of a first machine-learned model utilized by the target vehicle computing system) at the computing system, one or more ground truth bounding box proposals based, at least in part, on the intermediate representation. Each respective ground truth bounding box proposal of the one or more ground truth bounding box proposals can include a respective ground truth class score indicative of respective ground truth object classification and one or more respective ground truth bounding box parameters indicative of a respective ground truth spatial location and/or one or more respective ground truth dimensions of the respective ground truth object classification.

In addition, the computing system can obtain, via the second machine-learned model, one or more deviating bounding box proposals based, at least in part, on an intermediate representation modified by the initial intermediate representation deviation (e.g., a previously determined intermediate representation deviation, one or more randomly generated deviations, etc.). For example, each respective deviating bounding box proposal of the one or more respective deviating bounding box proposals can include a respective deviating class score indicative of a respective deviating object classification and one or more respective deviating bounding box parameters indicative of a respective deviating spatial location and one or more respective deviating dimensions of the respective deviating object classification. The computing system can modify the intermediate representation deviation for the intermediate representation based, at least in part, on a comparison between the one or more ground truth bound box proposals and the one or more deviating bounding box proposals.

More particularly, the computing system can determine an adversarial loss for the intermediate representation deviation based, at least in part, on the one or more ground truth bound box proposals and the one or more deviating bounding box proposals. The adversarial loss can be generated by a loss function configured to encourage confusion of the proposal class of a deviation bounding box (e.g., to create a false positive or false negative) and/or minimize the intersection-over-union (IoU) of the bounding box. The adversarial loss, for example, can be determined based, at least in part, on a difference between a ground truth class score corresponding to at least one ground truth bounding box proposal and a deviating class score corresponding to a deviating bounding box proposal corresponding to the at least one ground truth bounding box proposal. As an example, for detected objects, the loss function can be designed to suppress the score of the correct class to generate false positives. For background classes, the loss function can be designed to push up the score of an object class.

In addition, or alternatively, the adversarial loss can be determined based, at least in part, on a difference between one or more ground truth bounding box parameters corresponding to at least one ground truth bounding box proposal and one or more deviating bounding box parameters corresponding to a deviating bounding box proposal corresponding to the at least one ground truth bounding box proposal. For instance, the loss function can be designed to minimize the intersection-over-union (IoU) of the bounding box proposals to further degrade performance by producing poorly localized objects. In this way, the adversarial loss of a deviating autonomy output z' can be defined with respect to an unmodified autonomous output z instead of a ground truth. This can be beneficial as the computing system may not always have access to a ground truth.

For each bounding box proposal z, p can equal arg $\max_i \{z_{\sigma_i} | i=0 \ldots m\}$ the highest confidence class. Given the original ground truth bounding box proposal z and the deviating bounding box proposal z', the loss function is designed to push z' away from z:

$$\ell_{adv}(z', z) = \begin{cases} -\log(1 - z'_{\sigma_p}) \cdot IoU(z', z) & \text{if } p \neq k \text{ and } z_{\sigma_p} > \tau^+, \\ -\lambda \cdot z'^{\gamma}_{\sigma_q} \log(1 - z'_{\sigma_q}) & \text{if } p = k \text{ and } z_{\sigma_p} > \tau^-, \\ 0 & \text{otherwise} \end{cases}$$

When p≠k and the original prediction is not a background class, the loss function can apply an untargeted loss to reduce the likelihood of the intended class. When the intended prediction is the background class k, the loss function can specifically target a non-background class q to generate a false positive. The loss function can choose q to be the class with the highest confidence that is not the background class. The IoU operator can denote the intersection-over-union of two bounding box proposals, λ can be a weighting coefficient, and $\tau^-$, $\tau^+$ can filter out proposals that are not confident enough. In some implementations, ∈ can be set to 0.1, λ can be set to 0.2, $\tau^-$ can be set to 0.7, $\tau^+$ can be set to 0.3, and γ can be set to 1.

In some implementations, the adversarial loss can be minimized over all bounding box proposals when generating the intermediate representation deviation. The optimal intermediate representation deviation under an $\epsilon - l_\infty$ bound can include:

$$\delta^* = \underset{\|\delta\|_\infty \leq \epsilon}{\arg\min} \sum_{m=1}^{M} \ell_{adv}(z'^{(m)}, z^{(m)}).$$

The adversarial loss can be minimized across all bounding box proposals using projected gradient descent (PGD), clipping δ to be within [−∈, ∈]. In some implementations, for projected gradient descent, Adam can be used with a learning rate of 0:1 and one to fifteen PGD steps, depending on a dataset, can be used. In this manner, the computing system can modify the intermediate representation deviation based, at least in part, on the adversarial loss. For instance, the intermediate representation deviation can be modified to minimize the adversarial loss over the one or more deviating bounding box proposals.

In some implementations, the computing system may not have access to (or knowledge of) the machine-learned model. In such a case, the computing system may not have access to (or knowledge of) the weights of the machine-learned model G. In order to tailor the intermediate representation deviation to the machine-learned model G, the computing system can generate a surrogate machine-learned model G' configured to imitate the machine-learned model G. As described herein, the computing system can utilize the surrogate machine-learned model to determine an intermediate representation deviation that is transferable to the machine-learned model.

To do so, the computing system can access a plurality of samples of intermediate feature maps generated by the machine-learned model (e.g., a first portion thereof). For example, the computing system can obtain a plurality of intermediate representations representative of a surrounding environment of the target vehicle computing system (e.g., of the target autonomous vehicle, etc.) at a plurality of times. For instance, the computing system can "spy" on a communication channel between the target vehicle computing system and another transmitting computing system (e.g., another transmitting autonomous vehicle, infrastructure element, etc.). The computing system can utilize adversarial descriptive domain adaptation to align the distribution of the received intermediate representation m and surrogate intermediate representations m' generated by the surrogate machine-learned model (e.g., a first portion thereof) without explicit input-feature pairs.

For example, the computing system can generate a surrogate machine-learned model based, at least in part, on the plurality of intermediate representations and train the machine-learned model (and/or a first portion thereof) to generate surrogate intermediate representations resembling the distribution of the plurality of received intermediate representations. For instance, as described above, each intermediate representation of the plurality of intermediate representations can be generated by a first portion of a targeted machine-learned model associated with the target autonomous vehicle. The first portion of the surrogate machine-learned model can be trained to output a surrogate intermediate representation substantially similar to the plurality of intermediate representations. In this manner, the surrogate machine-learned model can be used to generate intermediate representation deviations tailored to the target machine-learned model.

More particularly, the computing system can obtain sensor data representative of a secondary environment proximate to the target autonomous vehicle. The surrogate machine-learned model can be generated based, at least in part, on the plurality of intermediate representations and the sensor data. For example, the computing system can generate a surrogate intermediate representation based, at least in part, on the sensor data. The surrogate intermediate representation, for example, can be generated by a first portion (e.g., one or more first (e.g., intermediate) neural network layers) of the surrogate machine-learned model based, at least in part, on the sensor data.

The computing system can compare the surrogate intermediate representation to at least one of the plurality of received intermediate representations and train the surrogate machine-learned model to minimize any difference between the two representations. For example, the computing system can generate, via a machine-learned discriminator model, a discriminator loss based, at least in part, on the surrogate intermediate representation and at least one of the plurality of intermediate representations. The machine-learned discriminator model can include one or more neural networks (e.g., convolutional neural networks) configured to output a discriminator loss designed to force the first portion of the surrogate machine-learned model to output intermediate representations similar to those output by the first portion of the target machine-learned model. The computing system can train the surrogate machine-learned model to minimize the discriminator loss by generating surrogate intermediate representations representative of the targeted intermediate representations. For instance, the discriminator loss can be indicative of a difference between the surrogate intermediate representation and the at least one intermediate representation and the discriminator loss can be minimized by minimizing the differences between the surrogate intermediate representation and the at least one intermediate representation.

More particularly, in an original training pipeline, a first portion F' and second portion G' of the surrogate machine-learned model could be trained to minimize task loss:

$$\ell_{adv}(z, y, b) = \begin{cases} -\log(z_{\sigma_y}) - IoU(z, b) & \text{if } y \neq k, \\ -\log(z_{\sigma_y}) & \text{if } y = k, \end{cases}$$

where b can be a ground truth bounding box (e.g., not available here) and y its class. To incorporate domain adaptation, the machine-learned discriminator model D can be introduced to distinguish between targeted intermediate representations m and surrogate intermediate representations m'. The three modules F', G', and D can be optimized using min-max criterion:

$$\min_{F'G'} \max_{D} \mathcal{L}_{task}(x) - \beta[\mathcal{L}_{dis}(F'(x), 0) + \mathcal{L}_{dis}|(F(x), 1)]$$

where $\beta$ can be a weighting coefficient. The discriminator loss can be defined as:

$$\mathcal{L}_{dis}(\mu, c) = -c \log(D(\mu)) - (1-c)\log(1-D(\mu))$$

to supervise the discriminator. For example, pi can be an intermediate representation, c can equal 1 to indicate targeted intermediate representations from F (e.g., the first portion of the targeted machine-learning model) and c can equal 0 to indicate surrogate intermediate representations from F'. In some implementations, spectral normalization and a two-time update rule can be adopted in the discriminator during training for stability.

The surrogate model can use the same architecture and dataset as the target model. In such a case, when training the surrogate model, in some implementations, the computing system can set $\beta$ to 0.01, model learning rate to 0.001 and discriminator learning rate 0:0005. The models can be evaluated by computing an area under the precision-recall curve of bounding boxes, where bounding boxes can be correct if they have an IoU greater than 0.7 with a ground truth box of the same class.

The computing system can obtain a target intermediate representation from another transmitting computing system (e.g., another transmitting autonomous vehicle, infrastructure element, etc.). For example, the target intermediate representation can include at least one of the plurality of targeted intermediate representations. The computing system can determine an intermediate representation deviation for the target intermediate representation based, at least in part, on the target intermediate representation and the surrogate machine-learned model (e.g., in the manner described above). By way of example, the computing system can obtain, via the second portion of the surrogate machine-learned model, one or more ground truth bounding box proposals based, at least in part, on the target intermediate representation. In addition, or alternatively, the computing system can obtain, via the second portion of the surrogate machine-learned model, one or more deviating bounding box proposals based, at least in part, on an intermediate representation modified by the intermediate representation deviation. The computing system can modify (e.g., in the manner described above) the intermediate representation deviation for the target intermediate representation based, at least in part, on a comparison between the one or more ground truth bound box proposals and the one or more deviating bounding box proposals.

The computing system can generate data indicative of a modified intermediate representation based, at least in part, on the intermediate representation (e.g., target intermediate representation, etc.) and the intermediate representation deviation corresponding to the intermediate representation. For example, the computing system can apply the intermediate representation deviation to the corresponding intermediate representation to generate the modified intermediate representation. As described herein, the modified intermediate representation can be configured to cause the machine-learned model to output inaccurate autonomous output.

As discussed herein, in some implementations, the computing system can include a transmitting vehicle computing system onboard a transmitting autonomous vehicle physically located proximate to the target autonomous vehicle. In such a case, the transmitting vehicle computing system can generate a plurality of modified intermediate representations for transmission to the target autonomous vehicle. The plurality of modified intermediate representations, for example, can be based, at least in part, on consecutive frames of sensory information collected by the transmitting vehicle computing system as the transmitting autonomous vehicle traverses a secondary environment proximate to the target autonomous vehicle. The plurality of modified intermediate representations can be generated by exploiting redundancies between the consecutive frames of sensory information.

For example, the intermediate representation deviation can be associated with a first time. The computing system can obtain movement data indicative of a motion of the transmitting autonomous vehicle from the first time to a second time. The computing system can obtain second sensor data representative of the secondary environment proximate to the target autonomous vehicle at the second time. The computing system can generate a second intermediate representation for the target autonomous vehicle based, at least in part, on the second sensor data. The computing system can determine a second intermediate representation deviation for the second intermediate representation based, at least in part, on the first intermediate representation deviation (e.g., determined at the first time) associated with the first time and the movement data. For example, the first intermediate representation deviation can be used as the initial intermediate representation deviation (e.g., a starting point) for the determination of the second intermediate representation deviation (e.g., determined at the second time) associated with the second time.

By way of example, an intermediate representation (e.g., feature maps) can capture the spatial context of sensory observations, which can change due to the transmitting autonomous vehicle's motion. In some implementations, the computing system can apply a rigid transformation on the first intermediate representation deviation at every time step to account for motion (e.g., as indicated by the movement data). In this manner, the computing system can generate stronger intermediate representation deviations that can be synchronized with the movement of sensory observations relative to the transmitting autonomous vehicle. As an example, the intermediate representation deviations can be updated by:

$$\delta^{(t+1)} \leftarrow H_{t \to t+1}(\delta^{(t)}) - \alpha \nabla_{H_{t \to t+1}(\delta)} \mathcal{L}_{adv}(Z^{(t+1)}, \tilde{Z}^{(t+1)}).$$

where $H_{t \to t+1}$ can be a rigid transformation mapping the transmitting autonomous vehicle's pose at time t to t+1. By leveraging temporal consistency, the computing system can generate strong intermediate representation deviations with only one gradient update per time step, reducing the time and computing resources devoted to generating modified intermediate representations.

The computing system can communicate the data indicative of the modified intermediate representation(s) to one or more devices (e.g., a target vehicle computing system) associated with the target autonomous vehicle. For example, the computing system can generate a first compressed intermediate representation by compressing the modified intermediate representation. For instance, the computing system can include a machine-learned compressor model. The compressor model can include an encoder, a quantizer, and/or entropy coding. A variational image compression algorithm can be used, where a convolutional neural network learns to compress an input (e.g., the modified intermediate representation) with the help of a learned hyperprior. The latent representation can then be quantized and further encoded losslessly with very few bits. In this way, the feature map of the modified intermediate representation (e.g., a rectangular tensor) can be compressed into a bitstream.

The computing system can communicate the compressed modified intermediate representation to the one or more devices (e.g., a target vehicle computing system) associated with the target autonomous vehicle. The compressed modified intermediate representation can be associated with a first time. For example, the first time can be a sensor timestamp indicative of when the sensor data (e.g., utilized to generate the compressed modified intermediate representation) was acquired.

The target autonomous vehicle can obtain the compressed modified intermediate representation from the computing system (e.g., transmitting vehicle computing system, transmitting autonomous vehicle, transmitting infrastructure element, etc.). The compressed modified intermediate representation can be indicative of at least a portion of a secondary environment proximate to the target autonomous vehicle. The target autonomous vehicle can also obtain compressed intermediate representations (e.g., modified, or unmodified) from one or more other systems (e.g., other autonomous vehicles, etc.).

The target autonomous vehicle (e.g., the one or more devices (e.g., the vehicle computing system) associated with the target autonomous vehicle) can generate a first decompressed intermediate representation by decompressing the compressed modified intermediate representation. For instance, the target autonomous vehicle can include a decompressor model that includes a decoder and entropy decoding techniques. The first decompressed intermediate representation can be generated via the application of the decompressor model.

The target autonomous vehicle (e.g., the one or more devices (e.g., the vehicle computing system) associated with the target autonomous vehicle) can determine, using one or more machine-learned models, an updated intermediate representation based, at least in part, on the first decompressed intermediate representation (e.g., originally generated by the computing system based, at least in part, on the modified intermediate representation) and a second intermediate representation generated by the target autonomous vehicle. The second intermediate representation can be generated by the target autonomous vehicle in a manner similar to that previously described with respect to the target autonomous vehicle (e.g., but not modified). For example, the target autonomous vehicle can obtain sensor data via one or more sensors of the target autonomous vehicle and determine the second intermediate representation based at least in part on the sensor data obtained via the one or more sensors of the target autonomous vehicle (e.g., by extracting features to create a down sampled spatial feature map).

The updated intermediate representation can be determined based, at least in part, on a machine-learned aggregation model configured to aggregate a plurality of intermediate representations from a plurality of autonomous vehicles or other remote devices/systems. The machine-learned aggregation model can include a graph neural network that includes a plurality of nodes. Each node of the graph neural network can correspond to a respective autonomous vehicle (and/or other device/system) of a plurality of autonomous vehicles (and/or other devices/systems) within the environment of the target autonomous vehicle. This can include, for example, vehicles within the communication range of the target autonomous vehicle. Each respective autonomous vehicle can be associated with a respective set of spatial coordinates, which can be represented by its associated node. One of the nodes can correspond to the computing system.

The machine-learned aggregation model can be configured to transform inputted intermediate representation(s) based at least in part on a set of spatial coordinates associated with the computing system. For instance, the machine-learned aggregation model can be configured to initialize a node state of at least one node of the graph neural network and update the node state of the at least one node based at least in part on a spatial transformation. For instance, in the graph neural network, each node can maintain a state representation. At each iteration, messages can be sent between nodes of the graph and the node states for each node can be updated based, at least in part, on the aggregated received information (e.g., of the messages) using a neural network.

The target vehicle computing system can generate an autonomy output for the target autonomous vehicle (e.g., as described herein) based at least in part on the updated intermediate representation. The autonomy output can be indicative of a bounding shape associated with an object within the environment of the target autonomous vehicle and one or more predicted future locations of the object. The target autonomous vehicle can utilize the machine-learned model (e.g., a second portion thereof) to generate the autonomy output. The target autonomous vehicle can input the updated intermediate representation into the machine-learned model and obtain the autonomy output as an output of the machine-learned model. For instance, the target autonomous vehicle can apply a set of four convolutional blocks to extract a high-level representation suitable for a perception and prediction task. The block helps to capture multi-scale context efficiently, which can be helpful for the prediction function. A feature map can be used with two network branches that output detection and motion forecasting estimates, respectively. The output of the detection branch can be parameterized as (x, y, w, h, θ), which denotes the position, size, and orientation of objects. This can be represented as a bounding shape associated with an object within the environment of the target autonomous vehicle. The output of the prediction branch can be parameterized as $(x_t, y_t)$, which denotes the object's location at future time step t. This can indicate one or more future location(s) of the object. The autonomy output can be indicative of the output of the detection branch and the prediction branch (e.g., a bounding shape and predicted future location(s)).

The machine-learned model can be trained to detect the modified intermediate representation. For example, to defend against an attack posed by the modified intermediate representation(s), the machine-learned model can be trained via adversarial training techniques. The adversarial training techniques can be applied to any of the model(s) discussed herein. For example, the machine-learned aggregation model can be trained, via adversarial training techniques, to detect modified intermediate representations before generating the updated intermediate representations. In this manner, modified intermediate representations can be discarded before generating the updated intermediate representation.

The machine-learned model(s) of the described system can be trained in several stages. For instance, a sensor backbone (e.g., a first portion, LIDAR backbone for helping to create the intermediate representation) and output headers can be pre-trained on a real-LIDAR single-vehicle dataset, bypassing the cross-vehicle aggregation stage. The loss function can be cross-entropy on a vehicle classification output and smooth l1 on the bounding box parameters. Hard-negative mining can be applied as well to improve performance. The sensor backbone (e.g., LIDAR backbone), cross-vehicle aggregation, and output header models can be jointly fine tuned on a simulated vehicle-to-vehicle dataset (described below) with synchronized inputs (e.g., no time delay) using the same loss function. The training can avoid the use of a temporal warping function at this stage. During training, for every example in the minibatch, the number of connected vehicles can be randomly sampled uniformly on [0,min(c, 6)], where c is the number of candidate vehicles available. This can help ensure that the architecture of the machine-learned model(s) can handle arbitrary graph connectivity while also making sure the fraction of vehicles in the scene/ecosystem on the network remains reasonable. With the main network trained, the compression model can be trained. To do so, the main network (backbone, aggregation, output header) can be fixed since this is reconstructing the decompressed feature map. The compression model can be trained with a rate-distortion objective, which aims to maximize the bit rate in transmission while minimizing the distortion between uncompressed and decompressed data. The rate objective can be defined as the entropy of the transmitted code, and the distortion objective as the reconstruction loss (e.g., between the decompressed and uncompressed feature maps).

The systems and methods described herein provide a number of technical effects and benefits. More particularly, the systems and methods of the present disclosure provide improved techniques for training machine learned models utilized by autonomous vehicles to perceive a surrounding environment. For instance, a computing system can include a machine-learned model that can enable the system to perceive its environment based, at least in part, on sensor data descriptive of the system's environment. The system can receive the sensor data, via a communication channel, that can be susceptible to malicious attacks designed to cause the machine-learned model to output inaccurate positions and classes of objects within the system's environment. The systems and methods of the present disclosure describe techniques for training the machine-learned model to identify malicious messages over a communication channel before using the information provided by the malicious message for perceiving a system's surrounding environment. In this way, the systems and methods described herein provide a practical improvement to autonomous vehicle safety, navigation, perception, and prediction by enabling a system to detect and ignore malicious messages designed to harm the integrity of the system.

Example aspects of the present disclosure can provide an improvement to computing technology, such as autonomous vehicle computing technology. For example, the present disclosure describes a computing system configured to obtain sensor data representative of a secondary environment proximate to an autonomous vehicle; generate an intermediate representation for the autonomous vehicle based, at least in part, on the sensor data; determine an intermediate representation deviation for the intermediate representation based, at least in part, on the intermediate representation and a machine-learned model associated with the autonomous vehicle; generate data indicative of a modified intermediate representation based, at least in part, on the intermediate representation and the intermediate representation deviation; and communicate the data indicative of the modified intermediate representation to a vehicle computing system associated with the autonomous vehicle. The computing system can accumulate and utilize newly available information in the form of an intermediate representation deviation to provide a practical improvement to machine-learning technology (e.g., machine-learning training technology). The intermediate representation deviation can be capable of causing a machine-learned model to output defective autonomous information. As a result, the computing system can expose vulnerabilities of state-of-the-art machine-learning models by modifying the intermediate representation output by a portion of the model(s) with the intermediate representation deviation. The computing system can further improve such state-of-the-art object detection models by using the intermediate representation deviations (as applied to various intermediate representations) to train the model(s) to overcome the exposed vulnerabilities. This, in turn, improves the functioning of machine-learning systems in general by increasing the reliability of the system(s) by decreasing the system(s) susceptibility to attacks via communication channels. Ultimately, the training techniques disclosed herein result in more accurate machine-learned systems; thereby improving an autonomous vehicle's perception, prediction, and motion through its environment and enhancing the safety of self-driving systems.

Various means can be configured to perform the methods and processes described herein. For example, a computing system can include data acquisition unit(s), intermediate representation generation unit(s), surrogate unit(s), intermediate representation deviation unit(s), modification unit(s), communication unit(s) and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data acquisition unit(s), etc.) can be configured to obtain sensor data representative of a secondary environment proximate to an autonomous vehicle. In addition, or alternatively, the means (e.g., data acquisition unit(s), etc.) can be configured to obtain a plurality of intermediate representations associated with an autonomous vehicle. Each intermediate representation can be descriptive of at least a portion of a secondary environment proximate to the autonomous vehicle at a plurality of times. The means (e.g., data acquisition unit(s), etc.) can be configured to obtain a target intermediate representation from the plurality of intermediate representations.

The means (e.g., surrogate unit(s), etc.) can be configured to generate a surrogate machine-learned model based, at least in part, on the plurality of intermediate representations. The means (e.g., intermediate representation generation unit(s), etc.) can be configured to generate an intermediate representation for the autonomous vehicle based, at least in part, on the sensor data. The intermediate representation can be descriptive of at least a portion of the secondary environment.

The means (e.g., intermediate representation deviation unit(s), etc.) can be configured to determine an intermediate representation deviation for the intermediate representation based, at least in part, on the intermediate representation and a machine-learned model associated with the autonomous vehicle. In addition, or alternatively, the means (e.g., intermediate representation deviation unit(s), etc.) can be configured to determine an intermediate representation deviation for the target intermediate representation based, at least in part, on the target intermediate representation and the surrogate machine-learned model.

The means (e.g., modification unit(s), etc.) can be configured to generate data indicative of a modified intermediate representation based, at least in part, on the intermediate representation and the intermediate representation deviation. In addition, or alternatively, the means (e.g., modification unit(s), etc.) can be configured to generate data indicative of a modified intermediate representation based, at least in part, on the target intermediate representation and the intermediate representation deviation. The means (e.g., communication unit(s), etc.) can be configured to communicate the data indicative of the modified intermediate representation to a vehicle computing system associated with the autonomous vehicle.

Furthermore, although aspects of the present disclosure focus on the application of training techniques described herein to object detection models utilized in autonomous vehicles, the systems and methods of the present disclosure can be used to train any machine-learned model. Thus, for example, the systems and methods of the present disclosure can be used to train machine-learned models configured for image processing, labeling, etc.

With reference to the figures, example embodiments of the present disclosure will be discussed in further detail.

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a lightweight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, detecting deviating intermediate representations, training machine-learned models to detect deviating intermediate representations, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g., intranet), wide area network (e.g., Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that are within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory (e.g., 220 of FIG. 2) can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 180 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 15. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein for deviating intermediate representation, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2:
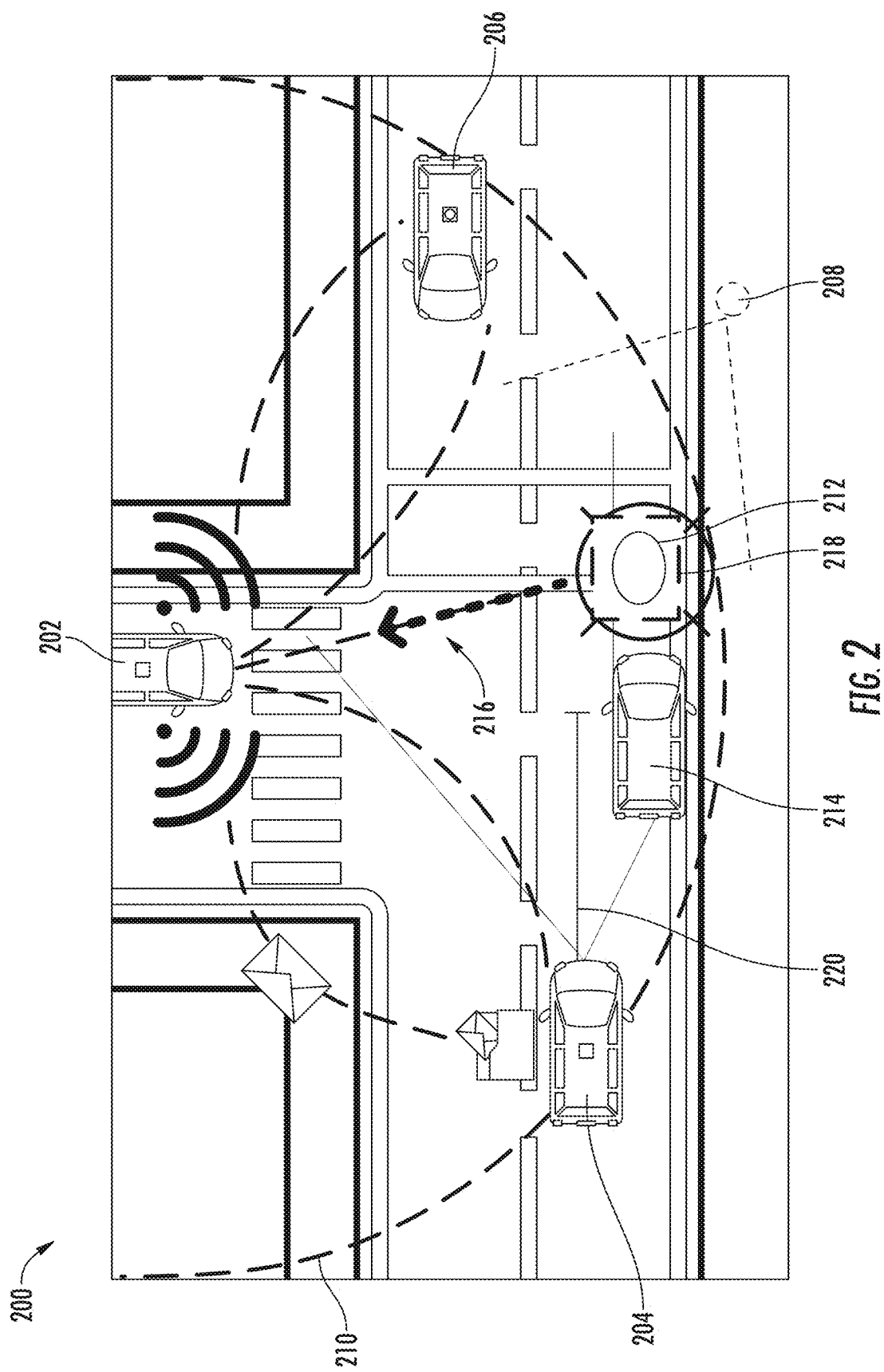
FIG. 2 depicts an example geographic area with a vehicle ecosystem according to example embodiments of the present disclosure.

Autonomous vehicles can operate within geographic areas or have operating domains that can include other autonomous vehicles. For instance, FIG. 2 depicts an example geographic area 200 with a vehicle ecosystem according to example embodiments of the present disclosure. A plurality of autonomous vehicles 202, 204, 206 can be located within the geographic area 200. The plurality of autonomous vehicles can include, for example, a first autonomous vehicle 202, a second autonomous vehicle 204, a third autonomous vehicle 206, etc. The first autonomous vehicle 202, second autonomous vehicle 204, and/or third autonomous vehicle 206 can be associated with the same fleet operator/owner or a different fleet operator/owner. The first autonomous vehicle 202, second autonomous vehicle 204, and/or third autonomous vehicle 206 can be the same or different types and/or versions of vehicle. Each of the first autonomous vehicle 202, second autonomous vehicle 204, and/or third autonomous vehicle 206 can be configured similar to the vehicle 102 described with reference to FIG. 1 and can include the same or similar vehicle computing system(s), functions, operations, etc.

In some implementations, the first autonomous vehicle 202, second autonomous vehicle 204, and/or third autonomous vehicle 206 can be utilized to provide a vehicle service. For example, an autonomous vehicle 202, 204, 206 can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system (e.g., operations computing system 104 of FIG. 1) of the service entity can help to coordinate the performance of vehicle services by autonomous vehicles 202, 204, 206. For instance, the operations computing system 104 can include a service platform. The service platform can include a plurality of back-end services and front-end interfaces, which are accessible via one or more APIs. For example, an autonomous vehicle 202, 204, 206 and/or another computing system that is remote from the autonomous vehicle (but associated therewith) can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle 202, 204, 206 to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles 202, 204, 206 that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle 202, 204, 206 can go online with a service entity by, for example, connecting with the service entity's operations computing system (e.g., the service platform) so that the vehicle's computing system can communicate with the operations computing system via one or more networks. Once online, the operations computing system can communicate a vehicle service assignment indicative of the requested vehicle services and/or other data to the autonomous vehicle 202, 204, 206.

The geographic area 200 can include one or more travel ways (e.g., roadways, etc.) and one or more geographic features (e.g., cross walks, lane boundaries, etc.). In some implementations, the geographic area 200 can include one or more infrastructure elements 208 that include systems with communication technology capable of communicating with one or more of the autonomous vehicles 202, 204, 206 within the geographic area 200. As further described herein, the infrastructure elements 208 can provide sensor data and/or intermediate representations to the autonomous vehicles 202, 204, 206. The infrastructure element(s) 208 can include, for example, a sensor suite/system attached and/or included in a building or other structure such as, for example, a lamppost, traffic light, etc.

The geographic area 200 can also include one or more objects. The objects can include, for example, static object(s) (e.g., lampposts, parking meters, etc.) and/or dynamic actor objects (e.g., pedestrians, vehicles, bicycles/bicyclists, etc.) that are and/or may be in motion. By way of example, the geographic area 200 can include an object 212. The object 212 can be within the field of view of sensors associated with one or more of the autonomous vehicles within the geographic area 200 (e.g., first autonomous vehicle 202, third autonomous vehicle). The object 212 can be occluded from a field of view of one or more sensors of the second autonomous vehicle 204. The object 212 can include, for example, a user that is associated with a service request for a vehicle service. An autonomous vehicle 202, 204, 206 can be assigned to the service request and, thus, may attempt to detect the user so that the user can board, enter, etc. the assigned autonomous vehicle, the vehicle's doors can be unlocked, the vehicle can send a message to the user, etc. In some implementations, the geographic area 200 can include one or more non-autonomous vehicles such as, for example, non-autonomous vehicle 214.

Each of the plurality of autonomous vehicles 202, 204, 206 can include a communication system that allows the respective vehicle's computing system to communicate with system(s) that are remote from the autonomous vehicle 202, 204, 206. For example, an autonomous vehicle 202, 204, 206 can utilize its communication system to send and receive data (e.g., via an internet connection) from a cloud-based server system that helps support the autonomous vehicle 202, 204, 206. This can include, for example, an offboard service assignment system that matches the autonomous vehicle to a request for a vehicle service (e.g., rideshare service), a routing system that provides the autonomous vehicle 202, 204, 206 with a route to follow for performing the vehicle service, a remote assistance system that can provide remote assistance to a vehicle, and/or other systems.

Each autonomous vehicle 202, 204, 206 can also have a communication range that allows the autonomous vehicle 202, 204, 206 to communicate with systems nearby the autonomous vehicle 202, 204, 206. For example, a first autonomous vehicle 202 (e.g., a recipient vehicle) can have a communication range 210. The communication range 210 can be based at least in part on the vehicle's communication hardware (e.g., antenna, etc.). Additionally, or alternatively, the communication range 210 can be based at least in part on the communication protocol utilized by the first autonomous vehicle 202. The communication range 210 can be represented by a radial distance from the first autonomous vehicle 202. The autonomous vehicle 202 can communicate with autonomous vehicle(s) 204, 206 within the communication range 210. For example, the second autonomous vehicle 204 (a "transmitter autonomous vehicle") can communicate data to the first autonomous vehicle 202 ("a recipient autonomous vehicle" that is different from the second autonomous vehicle 204) that is within the first communication range 210 of the first autonomous vehicle 202.

The first autonomous vehicle 202 can receive data from any number of autonomous vehicles (e.g., a third autonomous vehicle 206 (e.g., "a second transmitter vehicle")) within the communication range 210 of the autonomous vehicle 202. The systems and methods of the present disclosure can allow the ecosystem of autonomous vehicles/systems within a geographic area 200 to provide inter-vehicle/system communications that improve the vehicles'/ systems' autonomous operations while reducing the communication bandwidth and potential information loss associated with doing so.

Figure 3:
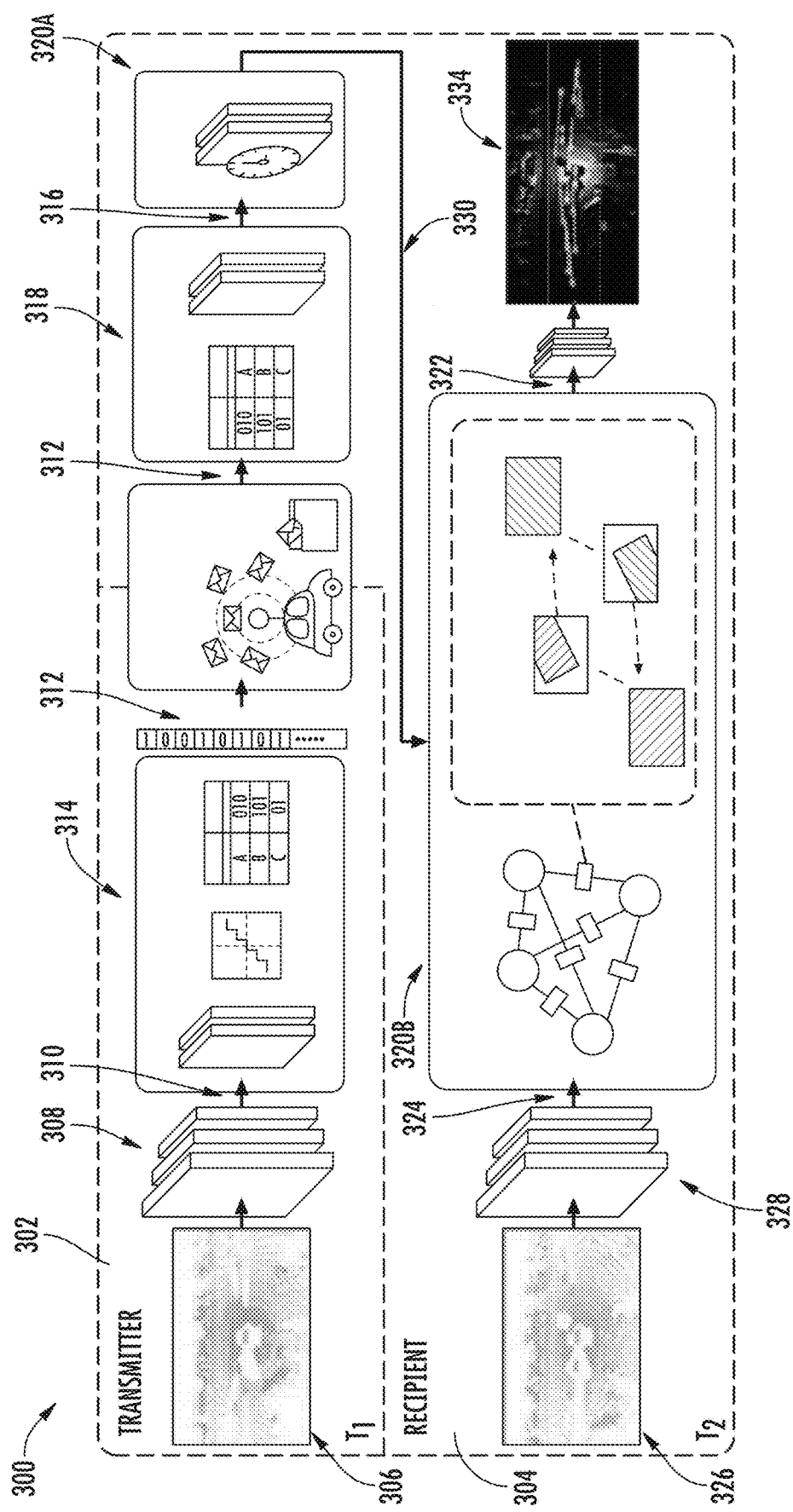
FIG. 3 depicts an architecture of example machine-learned models according to example embodiments of the present disclosure.

FIG. 3 depicts a diagram of an architecture 300 of example machine-learned model(s) that can allow for such improvements. The diagram illustrates the architecture 300 across two systems. This can include a transmitter system 302 and a recipient system 304. In some implementations, the transmitter system 302 can include a first/transmitter autonomous vehicle 202 (e.g., its onboard vehicle computing system) and the recipient system 304 can include a second/recipient autonomous vehicle 204 (e.g., its onboard vehicle computing system).

As described herein, the recipient system 304 can be a first computing system of a vehicle, robot, infrastructure element, etc. and the transmitter system 302 can be another computing system of a vehicle, robot, infrastructure element, etc. For example illustration purposes only, the following description is provided within the example context of the first and second autonomous vehicles 202, 204 communicating with one another.

For instance, the transmitter system 302 (e.g., a first/transmitter autonomous vehicle 202, its onboard vehicle computing system, etc.) can obtain (e.g., via the one or more sensors of the first autonomous vehicle 202) sensor data 306 associated with an environment (e.g., a portion of a surrounding environment of another, recipient autonomous vehicle) of the transmitter system 302 (e.g., the first autonomous vehicle 202). The sensor data 306 can include one or more types of sensor data associated with one or more sensor modalities. For example, the sensor data 306 can include three-dimensional point cloud data (e.g., three-dimensional LIDAR point cloud data). In some implementations, the sensor data 306 can include a fusion of different types of sensor data. For example, the sensor data 306 can include a first type of sensor data (e.g., camera image data) and a second type of sensor data (e.g., LIDAR data). The first type of sensor data can be associated with a first sensor modality (e.g., stereo camera) and the second type of sensor data (e.g., LIDAR data) can be associated with a second sensor modality (e.g., LIDAR system).

In some implementations, the sensor data 306 can include data acquired by multiple different systems (e.g., autonomous vehicles). For example, the sensor data 306 can include a first set of sensor data (e.g., a first set of LIDAR data) acquired by the transmitter system 302 (e.g., the first autonomous vehicle 202) and a second set of sensor data (e.g., a second set of LIDAR data) that was acquired by another system (e.g., another autonomous vehicle 204, 206) in its ecosystem and sent to the transmitter system 302 (e.g., the first autonomous vehicle 202).

The transmitter system 302 (e.g., the first autonomous vehicle 202, its onboard computing system, etc.) can generate an intermediate representation 310 for use by another vehicle (e.g., a second/recipient/target autonomous vehicle 204). The intermediate representation 310 can be generated based, at least in part, on the sensor data 306 and can be descriptive of at least a portion of an environment of the other autonomous vehicle. As one example, the transmitter system 302 can determine the intermediate representation 310 of at least a portion of the surrounding environment of a second/recipient vehicle based at least in part on the sensor data 306. The intermediate representation 310 can include a feature map indicative of at least a portion of the environment. To determine the intermediate representation 310, the transmitter system 302 can generate voxelized sensor data by voxelizing the three-dimensional point cloud data of the sensor data 306. By way of example, the transmitter system 302 can extract raw features from its LIDAR sensor data and transform them into a bird's eye view (BEV). The features can include, for example, a heading and/or shape of an object indicated in the intermediate environmental representation 310. The transmitter system 302 can voxelize the LIDAR point clouds (e.g., in 15 cm$^3$, etc.), apply several convolutional layers, and output feature maps of shape H×W×C, where H×W denotes the scene range in BEV, and C is the number of feature channels.

Figure 4:
FIG. 4 depicts a visualization of an example intermediate environmental representation according to example embodiments of the present disclosure.

FIG. 4, for example, depicts a visualization of an example intermediate environmental representation 400 according to example embodiments of the present disclosure. Turning back to FIG. 3, the intermediate representation 310 can be generated based, at least in part, on a machine-learned model 308 (e.g., a portion of a joint detection and prediction model) associated with the transmitting/recipient autonomous vehicles. The machine-learned models 308, 328 associated with the vehicles can include a machine-learned model utilized by the transmitter/recipient systems 302, 304 to perceive (e.g., identify) one or more objects within a surrounding environment and/or predict the motion of the one or more objects. The transmitter system 302 can generate the intermediate representation 310, via a first portion 308 of the machine-learned model (e.g., a convolutional neural network, etc.), based, at least in part, on the sensor data 306. The first portion 308, for example, can include one or more convolutional layers of the machine-learned model. For instance, the transmitter system can input the voxelized sensor data into the machine-learned model 308. The machine-learned model 308 can be configured to apply one or more convolutional layers to the voxelized sensor data. For example, the machine-learned model 308 can utilize a plurality of layers (e.g., three layers, etc.) of 3×3 convolution filters (e.g., with strides of 2, 1, 2 respectively) to produce the intermediate representation 310. The intermediate representation 310 can be, for example, a 4× down sampled spatial feature map. The feature map can be represented as a matrix generated from the array(s) of the sensor data. The transmitter system 302 can receive the intermediate representation 310 (e.g., an activation of intermediate neural network layers, etc.) as an output of the first portion 308 (e.g., one or more first (e.g., intermediate) neural network layers) of the machine-learned model.

The transmitter system 302 (e.g., the first autonomous vehicle 202, its onboard vehicle computing system) can generate a compressed intermediate representation 312 by compressing the intermediated representation 310 of at least the portion of the environment of the transmitter system 302 (e.g., the first autonomous vehicle 202). For instance, the transmitter system 302 can include a machine-learned compressor model 314. The machine-learned compressor model 314 can include an encoder, a quantizer, and entropy coding. A variational image compression algorithm can be used, where a convolutional neural network learns to compress an input (e.g., the first intermediate representation 310) with the help of a learned hyperprior. The latent representation can then be quantized and further encoded losslessly. The feature map of the intermediate representation 310 (e.g., a rectangular tensor) can be compressed into a bitstream.

The transmitter system 302 (e.g., the first autonomous vehicle 202, its onboard vehicle computing system, etc.) can determine a recipient to which to communicate the first compressed intermediate representation 310 from among a plurality of potential recipients. The transmitter system 302 can select the recipient system 304 based at least in part on a communication range of the transmitter system 302. For instance, the transmitter system 302 can determine that it will communicate the compressed intermediate representation 312 to one or more of the other computing systems within its communication range. By way of example, the first autonomous vehicle 202 can select the second autonomous vehicle 204, from among a plurality of autonomous vehicles, based at least in part on a communication range 210 of the autonomous vehicles 202, 204. The second autonomous vehicle 204 can be within the communication range 210 of the first autonomous vehicle 202 and thus may provide the intermediate representation 310 to the first autonomous vehicle 202 and/or vice versa.

The transmitter system 302 (e.g., the first autonomous vehicle 202, its onboard vehicle computing system, etc.) can communicate the compressed intermediate representation 312 to the recipient system 304 (e.g., the second autonomous vehicle 204, its onboard vehicle computing system, etc.). The compressed intermediate representation 312 can also be associated with a first time $T_1$. For example, the first time $T_1$ can be associated with a sensor timestamp of the transmitter system 302 (e.g., the first autonomous vehicle 202). The sensor timestamp can be indicative of when the sensor data 306 (e.g., utilized to generate the intermediate environmental representation 310) was acquired by the sensors of the transmitter system 302 (e.g., first autonomous vehicle 202).

The recipient system 304 (e.g., the second autonomous vehicle 204, its onboard computing system, etc.) can obtain the compressed intermediate representation 312, from the transmitter system 302 (e.g., the first autonomous vehicle 202, its onboard vehicle computing system, etc.). The compressed intermediate representation 312 can be indicative of at least a portion of an environment of the recipient system 304 (e.g., the first autonomous vehicle 202). For example, the compressed intermediate representation 312 can be a compressed feature map that was generated based on sensor data captured within a field of view of at least a portion of the environment of the recipient system 304. The recipient system 304 (e.g., the second autonomous vehicle 204) can also obtain compressed intermediate representations from one or more other transmitter systems (e.g., autonomous vehicle 206, infrastructure element 208, etc.).

The recipient system 304 (e.g., the second autonomous vehicle 204, its onboard computing system, etc.) can generate a decompressed intermediate representation 316 by decompressing the compressed intermediate representation 312. For instance, the recipient system 304 can include a decompressor model 318 that includes a decoder and entropy decoding techniques. The decompressed intermediate representation 316 can be generated via the application of the decompressor model 318.

The recipient system 304 (e.g., the second autonomous vehicle 204, its onboard computing system, etc.) can determine, using one or more machine-learned models 320A-B, an updated intermediate representation 322 based at least in part on the decompressed intermediate representation 316 (e.g., originally generated by the second autonomous vehicle 204) and a second intermediate representation 324 generated by the recipient system 304 (e.g., the second autonomous vehicle 204, its onboard computing system, etc.). The recipient system 304 (e.g., the second autonomous vehicle 204, its onboard computing system, etc.) can obtain the second intermediate representation 324 generated by the recipient system 304 (e.g., the second autonomous vehicle 204, its onboard computing system, etc.). For instance, the second intermediate representation 324 can be generated by the recipient system 304 in a manner similar to that previously described with respect to the transmitter system 302. By way of example, the recipient system 304 (e.g., the second autonomous vehicle 204, its onboard computing system, etc.) can obtain sensor data 326 via one or more sensors of the recipient system 304. The recipient system 304 can determine the second intermediate representation 324 based at least in part on the sensor data 326 obtained via the one or more sensors of the recipient system 304. This can be done utilizing a machine-learned model 328 (e.g., a first portion of the machine learned model) that is configured/trained similar to or the same as the machine-learned model 308 (of the transmitter system 302). For example, the machine-learned model 328 can be configured to extract features from the sensor data (e.g., from voxelized three-dimensional sensor data) to create a downsampled spatial feature map.

In some implementations, the one or more models 320A-B used to create the updated intermediate representation 322 can include a machine-learned time correction model 320A. The machine-learned time correction model 320A can include, for example, a neural network. The machine-learned time correction model 320A can be a time delay correction model configured to adjust the decompressed intermediate representation 316 to account for a time delay.

For instance, as described herein, the compressed intermediate representation 312 can be based at least in part on sensor data 306 acquired by the transmitter system 302 (e.g., the first autonomous vehicle 202, its onboard computing system, etc.) at a first time $T_1$. The first time can be, for example, associated with a sensor timestamp of the first autonomous vehicle 202. This can be a sensor timestamp reflecting the time at which the sensor acquired the sensor data 306. The machine-learned time correction model 320A can be configured to compensate for time differences between a plurality of times. For instance, the recipient system 304 can determine, using the machine-learned time correction model 320A, a time-corrected intermediate environmental representation 330 based at least in part on the first decompressed intermediate representation 316. The time-corrected intermediate environmental representation 330 can be adjusted based at least in part on a time difference between the first time $T_1$ and a second time $T_2$ associated with the recipient system 304. The second time can be, for example, indicative of a time at which the recipient system 304 intends to perceive the environment, a time at which the recipient system 304 has acquired its own sensor data to be used for autonomous operations (as described herein), and/or another time. The first time $T_1$ and the second time $T_2$ can be based on similar time scales/references to help ensure accuracy. For example, the first time $T_1$ and the second time $T_2$ can be based on global positioning system data. Accordingly, the time-corrected intermediate environmental representation 330 can account for a time delay associated with the compressed intermediate representation 312 obtained from the transmitter system 302 via the use of one or more machine-learned models (e.g., a time delay correction model, etc.).

The recipient system 304 (e.g., the second autonomous vehicle 204, etc.) can perform one or more autonomy operations (e.g., of the second autonomous vehicle 204, etc.) based at least in part on the time-corrected intermediate representation 330. For instance, the recipient system 304 (e.g., the second autonomous vehicle 204, etc.) can input the decompressed intermediate representation 316 into the machine-learned time correction model 320A (e.g., neural network) and can obtain the time-corrected intermediate environmental representation 330 as an output of the machine-learned time correction model 320A. The recipient system 304 (e.g., the second autonomous vehicle 204, etc.) can generate an updated intermediate representation 322 based at least in part on the time-corrected intermediate representation 330. For example, as further described herein, the recipient system 304 (e.g., the second autonomous vehicle 204, etc.) can aggregate, using a machine-learned aggregation model 320B, the time-corrected intermediate environmental representation 330 and a second intermediate environmental representation 324 generated by the recipient system 304 (e.g., the first autonomous vehicle 202, etc.). The recipient system 304 (e.g., the first autonomous vehicle 202, etc.) can generate an autonomy output 334 based at least in part on the time-corrected intermediate representation 330. For example, the recipient system 304 (e.g., the first autonomous vehicle 202, etc.) can generate an updated intermediate representation 322 based at least in part on the time-corrected intermediate representation 330 and generate the autonomy output 334 based at least in part on updated intermediate representation. As further described herein, the autonomy output 334 can be indicative of, for example, perception data and prediction data associated with the recipient system 304 (e.g., the first autonomous vehicle 202, etc.).

The one or more models used to create the updated intermediate representation can include a machine-learned aggregation model 320B. The machine-learned aggregation model 320B can be configured to aggregate a plurality of intermediate representations from a plurality of sources (e.g., autonomous vehicles). For instance, the recipient system 304 (e.g., the first autonomous vehicle 202, etc.) can determine, using the machine-learned aggregation model 320B, an updated intermediate representation 322 based at least in part on the decompressed intermediate representation 316 and the second intermediate representation 324. As described herein, the decompressed intermediate representation 316 can be adjusted to account for the time delay (using a time delay correction model). Thus, the machine-learned aggregation model 320B can utilize the time-corrected intermediate representation 330 version of the decompressed intermediate representation 316. By way of example, the recipient system 304 (e.g., the second autonomous vehicle 204, etc.) can input the decompressed intermediate representation 316 (e.g., the time-corrected intermediate representation 330 version) and the second intermediate representation 324 (e.g., generated by the first autonomous vehicle 202) into the machine-learned aggregation model 320B. The machine-learned aggregation model 320B can be configured to aggregate the decompressed intermediate representation 316 (e.g., the time-corrected intermediate representation 330 version) and the second intermediate representation 324 to generate the updated intermediate representation 322. The machine-learned aggregation model 320B can ingest other intermediate representations received from other systems (e.g., vehicles, infrastructure elements, etc.) as well. The recipient system 304 (e.g., the second autonomous vehicle 204, etc.) can obtain the updated intermediate representation 322 as an output of the machine-learned aggregation model 320B.

Figure 5:
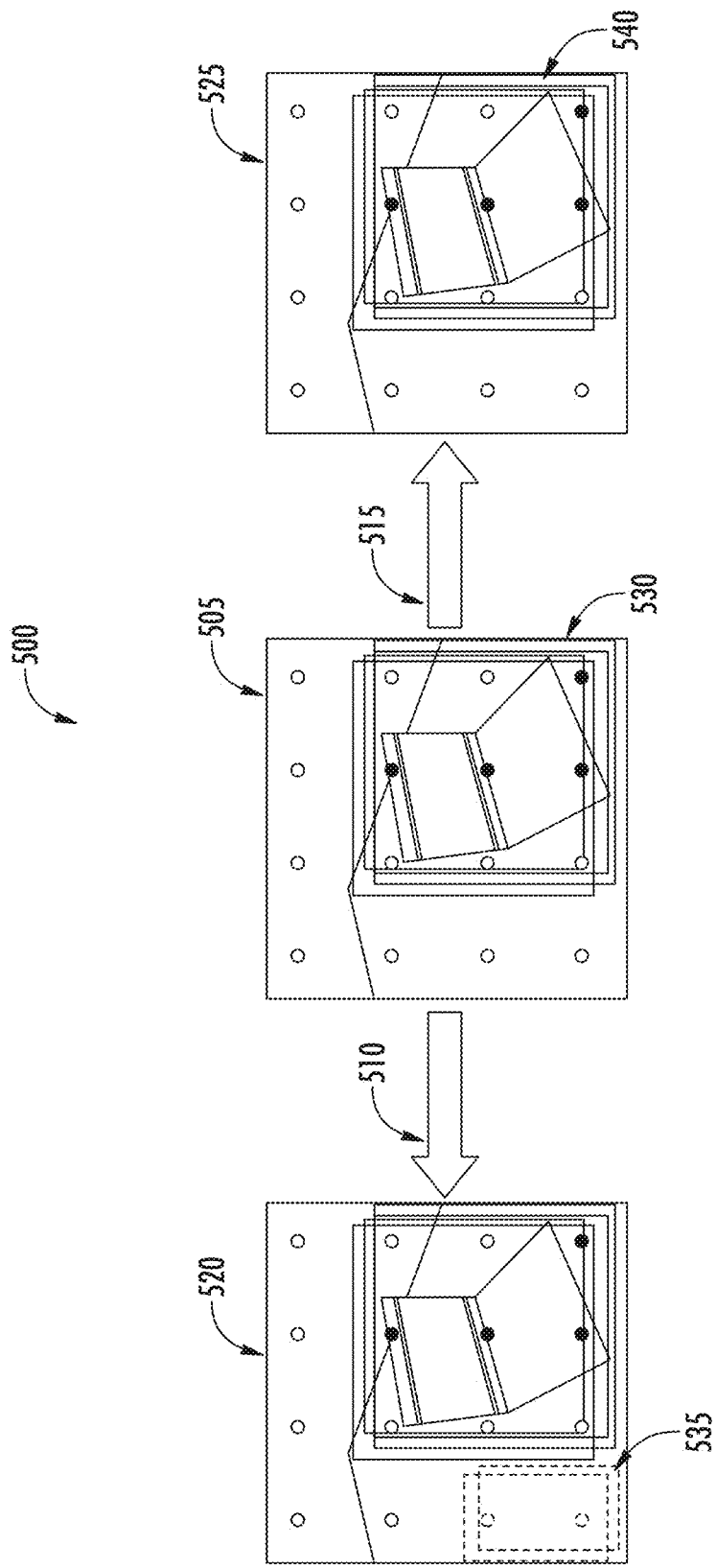
FIG. 5 depicts example intermediate representation manipulations according to example embodiments of the present disclosure.

In this manner, the recipient system 304 (e.g., the second autonomous vehicle 204, etc.) can obtain one or more intermediate representations from one or more different autonomous vehicles (and/or other systems). In this way, an ecosystem of autonomous vehicles and related systems (operations systems, third party systems, etc.) can communicate to improve a vehicles' autonomous operations. As described herein, such communications may potentially be susceptible to malicious attacks designed to degrade the autonomous performance of the vehicles. For example, FIG. 5 depicts example diagram 500 illustrating intermediate representation manipulations according to example embodiments of the present disclosure. The intermediate representation manipulations 510, 515 can be applied to an intermediate representation 505 to generate deviating intermediate representations 520, 525 designed to degrade the autonomous performance of an autonomous vehicle. By way of example, the intermediate representation deviations 510, 515 can include one or more perturbations that can be applied to the intermediate representation 505. For example, as discussed in further detail herein, the intermediate representation deviations 510, 515 can include deviations to the intermediate representation 505 designed to cause false positives 535, false negatives 540, and/or poor localization results by the target machine-learned model utilized by the target autonomous vehicle for autonomous functionalities (e.g., object detection, prediction, motion planning, etc.). As examples, the intermediate representation deviation 510 can be applied to intermediate representation 505 to generate a deviating intermediate representation 520 with a false positive 535 indicative of an object that is not located within an environment of an autonomous vehicle. As another example, the intermediate representation deviation 515 can be applied to intermediate representation 505 to generate a deviating intermediate representation 525 with a false negative 540 misclassifying a detected object 530 located within an environment of an autonomous vehicle. The systems and methods of the present disclosure expose these vulnerabilities such that machine-learned models (e.g., joint perception and prediction models) can be trained to identify and proactively handle malicious behavior.

Figure 6:
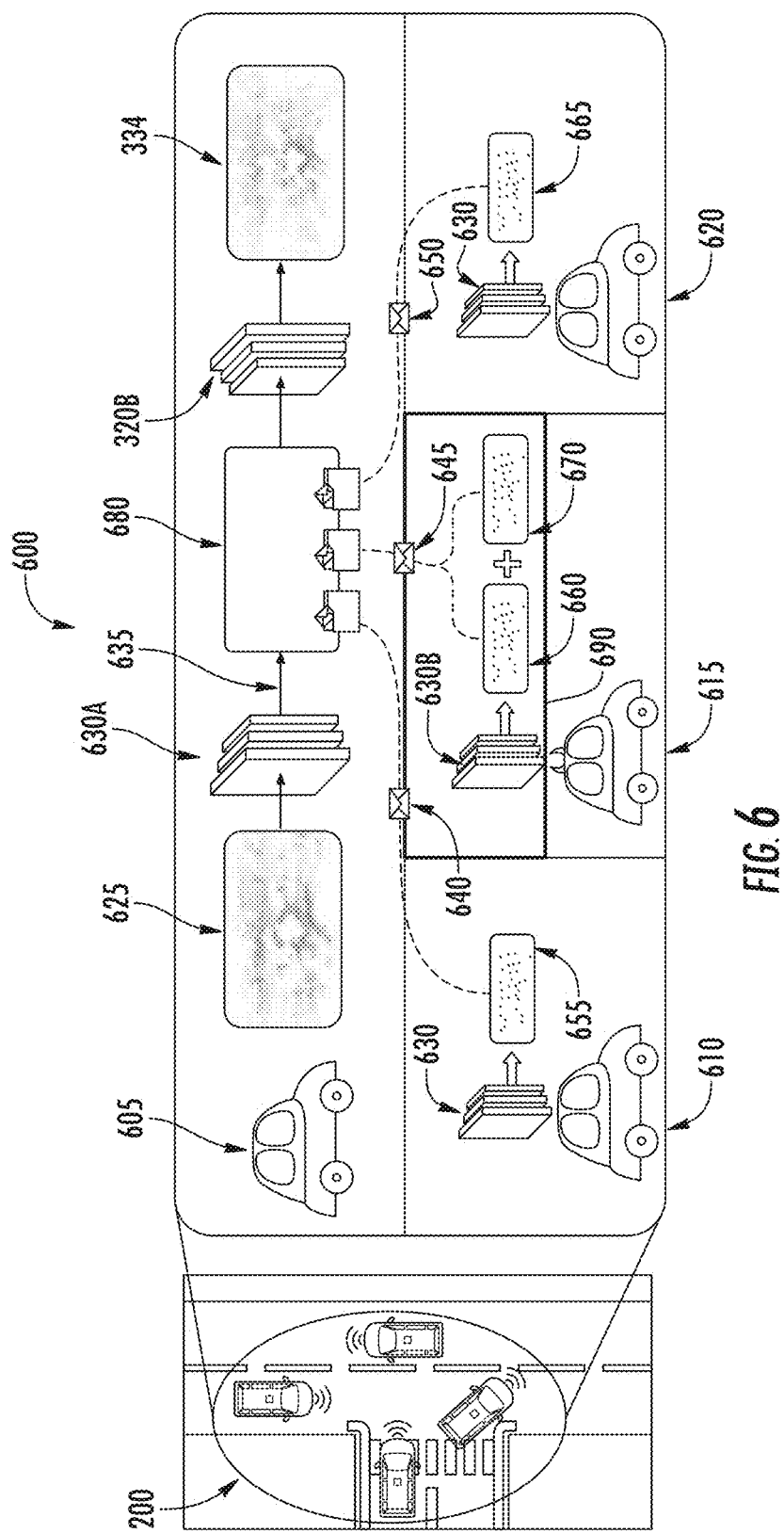
FIG. 6 depicts a diagram of a multi-agent scenario including an adverse agent according to example embodiments of the present disclosure.

FIG. 6 depicts a diagram of a multi-agent scenario 600 including an adverse agent according to example embodiments of the present disclosure. The multi-agent scenario 600 can include a scenario 200 in which one or more vehicles communicate to perceive an environment. The scenario 600 can include a first/target autonomous vehicle 605 (e.g., recipient vehicle system 304, second autonomous vehicle 204, etc.) and one or more transmitting autonomous vehicles/systems 610, 615, 620 (e.g., transmitter system 302, first autonomous vehicle 202, infrastructure element 208, etc.). The transmitting vehicles/systems 610, 615, 620 can include one or more benevolent vehicles/systems 610, 620 and/or one or more adverse vehicles/systems 615.

As described above, a computing system (e.g., an operations computing system, a transmitting vehicle computing system of transmitting vehicles 610, 615, 620, a recipient computing system of the recipient vehicle 605, etc.) can obtain sensor data (e.g., sensor data 625 obtained by the target autonomous vehicle 605) representative of an environment proximate to an autonomous vehicle (e.g., target autonomous vehicle 605). For instance, the environment can include a portion of a surrounding environment of the target autonomous vehicle 605 as represented by the sensor data 625. As described herein, the target autonomous vehicle can determine an intermediate representation 635 based on the sensor data 625 and at least a portion 630A of a machine-learned model. In addition, the target autonomous vehicle 605 can receive one or more messages 640, 645, 650 from one or more transmitting autonomous vehicle(s) 610, 615, 620. Each message 640, 645, 650 can include data indicative of a respective intermediate representation 655, 660, 665 from a respective transmitting autonomous vehicle 610, 615, 620 (e.g., generated via a respective machine-learned model 630B). The intermediate representation 655, 660, 665 can represent an environment associated with the target autonomous vehicle 605.

An environment (e.g., from a respective message), for example, can be a secondary environment associated with the target autonomous vehicle 605. By way of example, the secondary environment can be an environment surrounding an entity (e.g., aerial vehicle (e.g., drone, etc.), ground vehicle (autonomous ground vehicle, etc.), stationary object (e.g., traffic light, etc.), etc.), etc. that is located proximate to the target autonomous vehicle 605. As one example, a computing system 690 can include a vehicle computing system onboard a transmitting autonomous vehicle 610, 615, 620 located proximate to the target autonomous vehicle 605. The transmitting autonomous vehicle(s) 610, 615, 620 (e.g., its onboard vehicle computing system) can obtain sensor data, via one or more sensor(s) of the vehicle computing system, associated with a surrounding environment (e.g., a secondary environment proximate to the target autonomous vehicle 605) of the transmitting autonomous vehicle(s) 610, 615, 620.

The computing system 690 (e.g., operations computing system, adverse autonomous vehicle computing system, etc.) can generate an intermediate representation 660 for use by another autonomous vehicle (e.g., target autonomous vehicle 605). The intermediate representation 660 can be generated based, at least in part, on sensor data (e.g., obtained by the computing system) and can be descriptive of at least a portion of the secondary environment. As one example, the transmitting autonomous vehicle 615 can determine an intermediate representation 660 of at least a portion of the surrounding environment of the transmitting autonomous vehicle 615 based at least in part on sensor data. The intermediate representation 660 can include a feature map indicative of at least a portion of the secondary environment. This portion of the secondary environment can be, for example, a portion of the computing system's 690 (and/or associated device(s)) environment that can be captured within the sensor's field of view (or a portion thereof) and represented in the sensor data.

The intermediate representation 660 can be generated based, at least in part, on a machine-learned model (e.g., a portion 630A of joint perception and prediction model) associated with the target autonomous vehicle 605. The machine-learned model associated with the target autonomous vehicle 605 can include a machine-learned model utilized by a target vehicle computing system of the target autonomous vehicle 605 to perceive (e.g., identify) one or more objects within its surrounding environment and/or predict the motion of the one or more objects. The computing system 690 can generate the intermediate representation 660, via a first portion 630B of the machine-learned model (e.g., a convolutional neural network, etc.), based, at least in part, on sensor data obtained by the system 690. The first portion 630B, for example, can include one or more convolutional layers of the machine-learned model. For instance, the computing system 690 can input the sensor data into the machine-learned model (and/or portion 630B thereof). The machine-learned model can be configured to apply one or more convolutional layers to the sensor data. For example, the machine-learned model can utilize a plurality of layers (e.g., three layers, etc.) of 3×3 convolution filters (e.g., with strides of 2, 1, 2 respectively) to produce the intermediate representation 660. The intermediate representation 660 can be, for example, a 4× down sampled spatial feature map. The feature map can be represented as a matrix generated from the array(s) of the sensor data. The computing system 690 can receive the intermediate representation 660 (e.g., an activation of intermediate neural network layers, etc.) as an output of the first portion 630 (e.g., one or more first (e.g., intermediate) neural network layers) of the machine-learned model.

The computing system 690 can determine an intermediate representation deviation 670 for the intermediate representation 660. As illustrated by FIG. 5, the intermediate representation deviation 670 can include one or more perturbations that can be applied to the intermediate representation 660. As examples, the intermediate representation deviation 670 can include deviations to the intermediate representation 660 designed to cause false positives, false negatives, and/or poor localization results by the target machine-learned model 320B utilized by the target autonomous vehicle 605 to generate autonomy output 334 for autonomous functionalities (e.g., object detection, prediction, motion planning, etc.).

As an example, a target vehicle computing system (e.g., of a target autonomous vehicle 605) can generate an autonomy output 334 based at least in part on one or more of received intermediate representations 655, 660, 665 received from a number of other systems 610, 615, 620, 690 (e.g., the computing system described herein, a transmitting autonomous vehicle, etc.). The autonomous output 334 can be indicative of one or more bounding box proposals indicative of one or more objects within the surrounding environment of the target autonomous vehicle 605 based, at least in part, on the one or more intermediate representations 655, 660, 665. As an example, the autonomy output 334 can be indicative of a bounding shape associated with an object within the environment of the target autonomous vehicle 605 and/or one or more predicted future locations of the object. In some implementations, to generate the autonomy output 334, the vehicle computing system can utilize a machine-learned model (and/or portion thereof) such as, for example, a second portion 320B of the machine-learned model (e.g., the joint perception and prediction model) utilized to generate the intermediate representations (e.g., via the first portion 630A). The machine-learned model (and/or portion 320B thereof) can be configured to generate the autonomy output(s) 334. For example, the machine-learned model can be configured to output the one or more bounding box proposals indicative of the one or more objects within the surrounding environment of the target autonomous vehicle 605 based, at least in part, on one or more intermediate representations 635, 655, 660, 665.

By way of example, the autonomy output 334 (e.g., denoted as Z) can include a set of M bounding box proposals $z^{(1)}, \ldots, z^{(M)}$ at different spatial locations. Each proposal can consist of class scores $z_{o_0}, \ldots, z_{o_k}$ and bounding box parameters describing the spatial location and dimensions of the bounding box. For instance, classes 0, ..., k−1 can include object classes and k can include background classes where no objects are detected. The machine-learned model (and/or portion 320B thereof) can be trained to predict the correct object class k and maximize the ratio of intersection over union (IOU) of proposed and ground truth bounding boxes. In post processing steps, bounding box proposals with high confidence can be selected and overlapping bounding boxes can be filtered with non-maximum suppression (NMS) to produce a single estimate per ground truth object.

The machine-learned model (e.g., model(s) 630A, 320B) can include an object detection model, perception model, prediction model, and/or a joint perception and prediction model. The model can include several memories, networks, and/or layers (neural network layers, convolutional layers, etc.). For example, the model can include a plurality of network branches (e.g., a branch for perception, a branch for prediction, etc.), a plurality of memories (e.g., an appearance memory, object path memory, etc.) as well as an object path proposal network and/or a path refinement network. The machine-learned model can include any number of duplicate models distributed among one or a plurality of autonomous vehicles and/or other computing systems. For example, a first machine-learned model 630A can be included on and/or utilized by a target vehicle computing system (and/or autonomous vehicle 605 thereof) and a second machine-learned model 630B can be included on and/or utilized by the computing system 690 (e.g., a transmitting autonomous vehicle, an operations computing system, an infrastructure element, etc.). The first machine-learned model 630A and the second machine-learned model 630B can include two versions (e.g., copies, etc.) of the same machine-learned model (and/or portions thereof).

The computing system 690 can determine the intermediate representation deviation 670 for the intermediate representation 660 based, at least in part, on the intermediate representation 660 and the machine-learned model (e.g., a second portion 320B of the machine-learned model used to generate the intermediate representation 660) associated with the target autonomous vehicle 605. For example, the intermediate representation deviation 670 can be tailored to the machine-learned model 630, 320B. As an example, the intermediate representation deviation 670 can include one or more deviations that, when applied to the intermediate representation 660, cause the machine-learned model to output inaccurate autonomy output. The inaccurate autonomy output, for example, can include one or more bounding box proposals with inaccurate class scores (e.g., false negatives, false positives, etc.), dimensions, and/or spatial location (e.g., false localization, etc.). The intermediate representation deviation 670 can be constrained such that an intermediate representation 660 modified by the intermediate representation deviation 670 can be indistinguishable to the machine-learned model (e.g., without the training techniques described herein). For example, the intermediate representation deviation 670 (e.g., denoted as δ) can be constrained by $\|\delta\| \leq \epsilon$, to ensure that the modified intermediate representation is subtle and difficult to detect.

The computing system 690 can determine the intermediate representation deviation 670 by comparing a ground truth autonomy output generated based, at least in part, on the intermediate representation 660 to a deviating autonomy output generated based, at least in part, on an intermediate representation 660 modified by an initial intermediate representation deviation 670. For example, the computing system 690 can obtain, via a second machine-learned model (e.g., a copy or surrogate of a first machine-learned model 320B utilized by the target vehicle computing system of the target autonomous vehicle 605) at the computing system 690, one or more ground truth bounding box proposals based, at least in part, on the intermediate representation 660. Each respective ground truth bounding box proposal of the one or more ground truth bounding box proposals can include a respective ground truth class score indicative of respective ground truth object classification and one or more respective ground truth bounding box parameters indicative of a respective ground truth spatial location and/or one or more respective ground truth dimensions of the respective ground truth object classification.

In addition, the computing system 690 can obtain, via the second machine-learned model, one or more deviating bounding box proposals based, at least in part, on an intermediate representation 660 modified by the initial intermediate representation deviation 670 (e.g., a previously determined intermediate representation deviation, one or more randomly generated deviations, etc.). For example, each respective deviating bounding box proposal of the one or more respective deviating bounding box proposals can include a respective deviating class score indicative of a respective deviating object classification and one or more respective deviating bounding box parameters indicative of a respective deviating spatial location and one or more respective deviating dimensions of the respective deviating object classification. The computing system 690 can modify the intermediate representation deviation 670 for the intermediate representation 660 based, at least in part, on a comparison between the one or more ground truth bound box proposals and the one or more deviating bounding box proposals.

More particularly, the computing system 690 can determine an adversarial loss for the intermediate representation deviation 670 based, at least in part, on the one or more ground truth bound box proposals and the one or more deviating bounding box proposals. The adversarial loss can be generated by a loss function configured to encourage confusion of the proposal class of a deviation bounding box (e.g., to create a false positive or false negative) and/or minimize the intersection-over-union (IoU) of the bounding box. The adversarial loss, for example, can be determined based, at least in part, on a difference between a ground truth class score corresponding to at least one ground truth bounding box proposal and a deviating class score corresponding to a deviating bounding box proposal corresponding to the at least one ground truth bounding box proposal. As an example, for detected objects, the loss function can be designed to suppress the score of the correct class to generate false positives. For background classes, the loss function can be designed to push up the score of an object class.

In addition, or alternatively, the adversarial loss can be determined based, at least in part, on a difference between one or more ground truth bounding box parameters corresponding to at least one ground truth bounding box proposal and one or more deviating bounding box parameters corresponding to a deviating bounding box proposal corresponding to the at least one ground truth bounding box proposal. For instance, the loss function can be designed to minimize the intersection-over-union (IoU) of the bounding box proposals to further degrade performance by producing poorly localized objects. In this way, the adversarial loss of a deviating autonomy output (e.g., denoted as z') can be defined with respect to an unmodified autonomous output (e.g., denoted as z) instead of a ground truth. This can be beneficial as the computing system 690 may not always have access to a ground truth.

For each bounding box proposal z, p can equal arg $\max_i \{z_{\sigma_i} | i=0 \ldots m\}$ the highest confidence class. Given the original ground truth bounding box proposal z and the deviating bounding box proposal z', the loss function is designed to push z' away from z:

$$\ell_{adv}(z', z) = \begin{cases} -\log(1 - z'_{\sigma_p}) \cdot IoU(z', z) & \text{if } p \neq k \text{ and } z_{\sigma_p} > \tau^+, \\ -\lambda \cdot z'^{\gamma}_{\sigma_q} \log(1 - z'_{\sigma_q}) & \text{if } p = k \text{ and } z_{\sigma_p} > \tau^-, \\ 0 & \text{otherwise} \end{cases}$$

When p≠k and the original prediction is not a background class, the loss function can apply an untargeted loss to reduce the likelihood of the intended class. When the intended prediction is the background class k, the loss function can specifically target a non-background class q to generate a false positive. The loss function can choose q to be the class with the highest confidence that is not the background class. The IoU operator can denote the intersection-over-union of two bounding box proposals, $\lambda$ can be a weighting coefficient, and $\tau^-$, $\tau^+$ can filter out proposals that are not confident enough. In some implementations, $\epsilon$ can be set to 0.1, $\lambda$ can be set to 0.2, $\tau^-$ can be set to 0.7, $\tau^+$ can be set to 0.3, and $\gamma$ can be set to 1.

In some implementations, the adversarial loss can be minimized over all bounding box proposals when generating the intermediate representation deviation 670. The optimal intermediate representation deviation under an $\epsilon -l_\infty$ bound can include:

$$\delta^* = \underset{\|\delta\|_\infty \leq \epsilon}{\mathrm{argmin}} \sum_{m=1}^{M} \ell_{adv}\left(z'^{(m)}, z^{(m)}\right).$$

The adversarial loss can be minimized across all bounding box proposals using projected gradient descent (PGD), clipping $\delta$ to be within $[-\epsilon, \varsigma]$. In some implementations, for projected gradient descent, Adam can be used with a learning rate of 0:1 and one to fifteen PGD steps, depending on a dataset, can be used. In this manner, the computing system 690 can modify the intermediate representation deviation 670 based, at least in part, on the adversarial loss. For instance, the intermediate representation deviation 670 can be modified to minimize the adversarial loss over the one or more deviating bounding box proposals.

In some implementations, the computing system 690 may not have access to (or knowledge of) the machine-learned model 630, 320B. In such a case, the computing system 690 may not have access to (or knowledge of) the weights of the machine-learned model (e.g., denoted as G). In order to tailor the intermediate representation deviation 670 to the machine-learned model 630, 320B (e.g., G), the computing system 690 can generate a surrogate machine-learned model (e.g., denoted as G') configured to imitate the machine-learned model 630, 320B (e.g., G). As described herein, the computing system 690 can utilize the surrogate machine-learned model to determine an intermediate representation deviation 670 that is transferable to the machine-learned model 630, 320B (e.g., G).

Figure 7A:
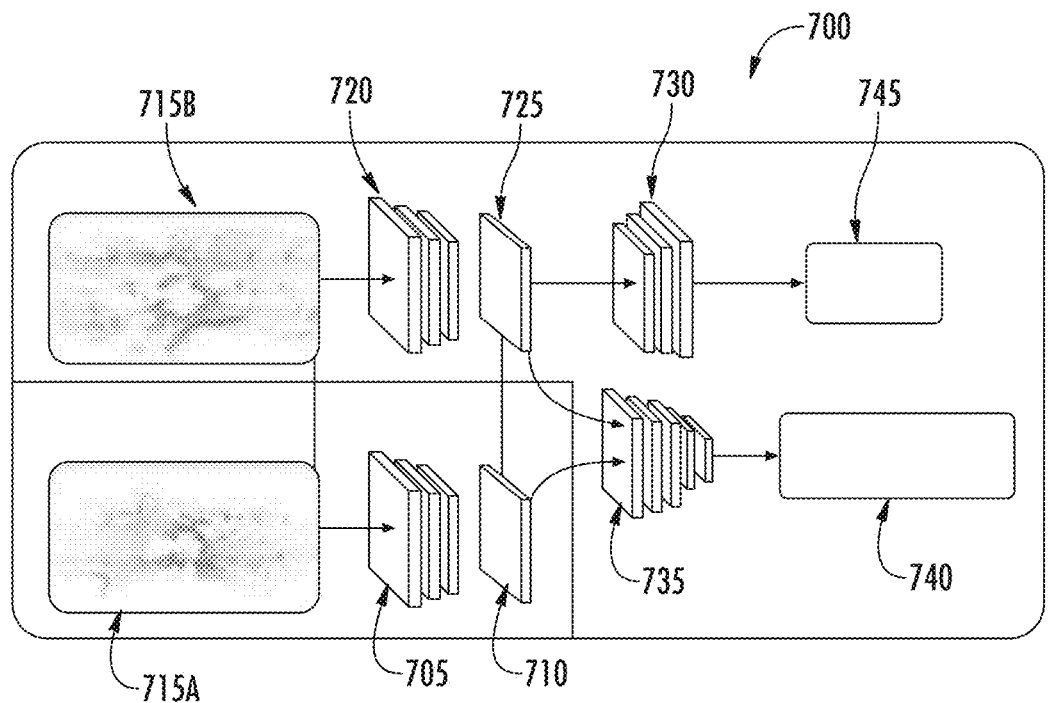
FIG. 7A depicts an example surrogate training scenario according to example embodiments of the present disclosure.

For example, FIG. 7A depicts an example surrogate training scenario 700 according to example embodiments of the present disclosure. FIG. 7A includes a first portion 705 of a target machine-learned model configured to generate an intermediate representation 710 based on sensor data 715A. In addition, the scenario 700 includes a first portion 720 and second portion 730 of a surrogate machine-learned model. The first portion 720 of the surrogate machine-learned model can be configured to generate an intermediate representation 725 based on sensor data 715B. The first portion 720 of the surrogate machine-learned model can be trained, by a discriminator model 735, to generate a deviating intermediate representation 725 matching the distribution of the first portion 705 of the target model. The discriminator model 735 can be trained based on a discriminator loss 740. The first 720 and second portion 730 of the surrogate machine-learned model can be trained based, at least in part, on a task loss 745.

More particularly, a computing system can access a plurality of samples of intermediate feature maps (e.g., intermediate representation 710) generated by the machine-learned model (e.g., a first portion 705 thereof). For example, the computing system can obtain a plurality of intermediate representations 710 representative of a surrounding environment of the target vehicle computing system (e.g., of the target autonomous vehicle, etc.) at a plurality of times. For instance, the computing system can "spy" on a communication channel between the target vehicle computing system and another transmitting computing system (e.g., another transmitting autonomous vehicle, infrastructure element, etc.). The computing system can utilize adversarial descriptive domain adaptation to align the distribution of the received intermediate representation 710 (e.g., denoted) m and surrogate intermediate representations 725 (e.g., denoted m') generated by the surrogate machine-learned model (e.g., a first portion 720 thereof) without explicit input-feature pairs.

For example, the computing system can generate a surrogate machine-learned model 720, 730 based, at least in part, on the plurality of intermediate representations (e.g., representation 710) and train the machine-learned model (and/or a first portion 720 thereof) to generate surrogate intermediate representations 725 resembling the distribution of the plurality of received intermediate representations 710. For instance, as described above, each intermediate representation of the plurality of intermediate representations can be generated by a first portion 705 of a targeted machine-learned model associated with the target autonomous vehicle. The first portion 720 of the surrogate machine-learned model can be trained to output a surrogate intermediate representation 725 substantially similar to the plurality of intermediate representations 710. In this manner, the surrogate machine-learned model can be used to generate intermediate representation deviations tailored to the target machine-learned model.

For example, the computing system can obtain sensor data 715B representative of a secondary environment proximate to the target autonomous vehicle. The surrogate machine-learned model 720, 730 can be generated based, at least in part, on the plurality of intermediate representations 710 and the sensor data 715B. For instance, the computing system can generate a surrogate intermediate representation 725 based, at least in part, on the sensor data 715B. The surrogate intermediate representation 725, for example, can be generated by a first portion 720 (e.g., one or more first (e.g., intermediate) neural network layers) of the surrogate machine-learned model 720, 730 based, at least in part, on the sensor data.

The computing system can compare the surrogate intermediate representation 725 to at least one of the plurality of received intermediate representations 710 and train the surrogate machine-learned model 720 to minimize any difference between the two representations 710, 725. For example, the computing system can generate, via the machine-learned discriminator model 735, a discriminator loss 740 based, at least in part, on the surrogate intermediate representation 725 and at least one of the plurality of intermediate representations 710. The machine-learned discriminator model 735 can include one or more neural networks (e.g., convolutional neural networks) configured to output a discriminator loss 740 designed to force the first portion of the surrogate machine-learned model 720 to output intermediate representations similar to those output by the first portion of the target machine-learned model 705. The computing system can train the surrogate machine-learned model 720 to minimize the discriminator loss 740 by generating surrogate intermediate representations representative of the targeted intermediate representations. For instance, the discriminator loss 740 can be indicative of a difference between the surrogate intermediate representation 725 and the at least one intermediate representation 710 and the discriminator loss 740 can be minimized by minimizing the differences between the surrogate intermediate representation 725 and the at least one intermediate representation 710.

More particularly, in an original training pipeline, a first surrogate portion 720 (e.g., denoted as F') and second surrogate portion (e.g., denoted as G') of the surrogate machine-learned model could be trained to minimize task loss 745:

$$\ell_{adv}(z, y, b) = \begin{cases} -\log(z_{\sigma_y}) - IoU(z, b) & \text{if } y \neq k, \\ -\log(z_{\sigma_y}) & \text{if } y = k, \end{cases}$$

where b can be a ground truth bounding box (e.g., not available here) and y its class. To incorporate domain adaptation, the machine-learned discriminator model 740 (e.g., denoted as D) can be introduced to distinguish between targeted intermediate representations 710 (e.g., denoted as m) and surrogate intermediate representations 725 (e.g., denoted as m'). The three modules 720, 730, 735 (e.g., F', G', and D) can be optimized using min-max criterion:

$$\min_{F'G'} \max_{D} \mathcal{L}_{task}(x) - \beta[\mathcal{L}_{dis}(F'(x), 0) + \mathcal{L}_{dis}|(F(x), 1)]$$

where $\beta$ can be a weighting coefficient. The discriminator loss can be defined as:

$$\mathcal{L}_{dis}(\mu, c) = -c \log(D(\mu)) - (1-c)\log(1-D(\mu))$$

to supervise the discriminator 735. For example, $\mu$ can be an intermediate representation, c can equal 1 to indicate targeted intermediate representations from F (e.g., the first portion of the targeted machine-learning model) and c can equal 0 to indicate surrogate intermediate representations from F'. In some implementations, spectral normalization and a two-time update rule can be adopted in the discriminator 735 during training for stability.

The surrogate model 720, 730 can use the same architecture and dataset as the target model 705. In such a case, when training the surrogate model 720, 730, in some implementations, the computing system can set $\beta$ to 0.01, model learning rate to 0.001 and discriminator learning rate 0:0005. The models can be evaluated by computing an area under the precision-recall curve of bounding boxes, where bounding boxes can be correct if they have an IoU greater than 0.7 with a ground truth box of the same class.

Figure 7B:
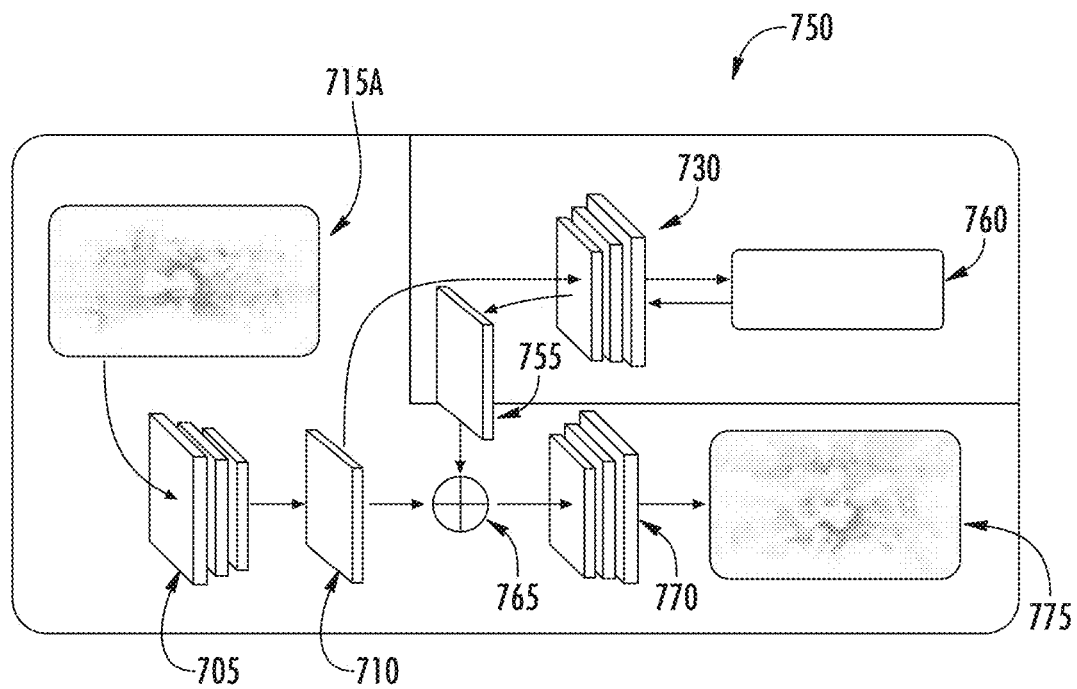
FIG. 7B depicts an example transfer attack scenario according to example embodiments of the present disclosure.

Turning to diagram 750 of FIG. 7B, the computing system can obtain a target intermediate representation 710 from another transmitting computing system (e.g., another transmitting autonomous vehicle, infrastructure element, etc.). For example, the target intermediate representation 710 can include at least one of the plurality of targeted intermediate representations. The computing system can determine an intermediate representation deviation 755 for the target intermediate representation 710 based, at least in part, on the target intermediate representation 710 and the surrogate machine-learned model 730 (e.g., in the manner described above). By way of example, the computing system can obtain, via the second portion 730 of the surrogate machine-learned model, one or more ground truth bounding box proposals based, at least in part, on the target intermediate representation 710. In addition, or alternatively, the computing system can obtain, via the second portion 730 of the surrogate machine-learned model, one or more deviating bounding box proposals based, at least in part, on an intermediate representation 710 modified by the intermediate representation deviation 755. The computing system can modify (e.g., in the manner described above) the intermediate representation deviation 755 for the target intermediate representation 710 based, at least in part, on a comparison between the one or more ground truth bound box proposals and the one or more deviating bounding box proposals (e.g., based, at least in part, on an adversarial loss 760, as described herein).

The computing system can generate data indicative of a modified intermediate representation 765 based, at least in part, on the intermediate representation 710 (e.g., target intermediate representation, etc.) and the intermediate representation deviation 755 corresponding to the intermediate representation 710. For example, the computing system can apply the intermediate representation deviation 755 to the corresponding intermediate representation 710 to generate the modified intermediate representation 765. As described herein, the modified intermediate representation 765 can be configured to cause the machine-learned model 770 to output inaccurate autonomous output 775.

Turning back to FIG. 6, in some implementations, the computing system 690 can include a transmitting vehicle computing system onboard a transmitting autonomous vehicle 615 physically located proximate to the target autonomous vehicle 605. In such a case, the transmitting vehicle computing system can generate a plurality of modified intermediate representations for transmission to the target autonomous vehicle 605. The plurality of modified intermediate representations, for example, can be based, at least in part, on consecutive frames of sensory information collected by the transmitting vehicle computing system as the transmitting autonomous vehicle 615 traverses a secondary environment proximate to the target autonomous vehicle 605. The plurality of modified intermediate representations can be generated by exploiting redundancies between the consecutive frames of sensory information.

For example, the intermediate representation deviation 670 can be associated with a first time. The computing system 690 can obtain movement data indicative of a motion of the transmitting autonomous vehicle 615 from the first time to a second time. The computing system 690 can obtain second sensor data representative of the secondary environment proximate to the target autonomous vehicle 605 at the second time. The computing system 690 can generate a second intermediate representation for the target autonomous vehicle 605 based, at least in part, on the second sensor data. The computing system 690 can determine a second intermediate representation deviation for the second intermediate representation based, at least in part, on the first intermediate representation deviation 670 (e.g., determined at the first time) associated with the first time and the movement data. For example, the first intermediate representation deviation 670 can be used as the initial intermediate representation deviation 670 (e.g., a starting point) for the determination of the second intermediate representation deviation (e.g., determined at the second time) associated with the second time.

By way of example, an intermediate representation 660 (e.g., feature maps) can capture the spatial context of sensory observations, which can change due to the transmitting autonomous vehicle's 615 motion. In some implementations, the computing system 690 can apply a rigid transformation on the first intermediate representation deviation 670 at every time step to account for motion (e.g., as indicated by the movement data). In this manner, the computing system 690 can generate stronger intermediate representation deviations that can be synchronized with the movement of sensory observations relative to the transmitting autonomous vehicle. As an example, the intermediate representation deviations can be updated by:

$$\delta^{(t+1)} \leftarrow H_{t \to t+1}(\delta^{(t)}) - \alpha \nabla_{H_{t \to t+1}(\delta)} \mathcal{L}_{adv}(Z^{(t+1)}, \hat{Z}^{(t+1)}).$$

where $H_{t \to t+1}$ can be a rigid transformation mapping the transmitting autonomous vehicle's pose at time t to t+1. By leveraging temporal consistency, the computing system 690 can generate strong intermediate representation deviations with only one gradient update per time step, reducing the time and computing resources devoted to generating modified intermediate representations.

The computing system 690 can communicate the data (e.g., message 645) indicative of the modified intermediate representation(s) to one or more devices (e.g., a target vehicle computing system) associated with the target autonomous vehicle 605. For example, the computing system 690 can generate a first compressed intermediate representation by compressing the modified intermediate representation (e.g., as described with reference to FIG. 2). For instance, the computing system 690 can include a machine-learned compressor model. The compressor model can include an encoder, a quantizer, and/or entropy coding. A variational image compression algorithm can be used, where a convolutional neural network learns to compress an input (e.g., the modified intermediate representation) with the help of a learned hyperprior. The latent representation can then be quantized and further encoded losslessly with very few bits. In this way, the feature map of the modified intermediate representation (e.g., a rectangular tensor) can be compressed into a bitstream.

The computing system 690 can communicate the compressed modified intermediate representation to the one or more devices (e.g., a target vehicle computing system) associated with the target autonomous vehicle 605. The compressed modified intermediate representation can be associated with a first time. For example, the first time can be a sensor timestamp indicative of when the sensor data (e.g., utilized to generate the compressed modified intermediate representation) was acquired.

The target autonomous vehicle 605 can obtain the compressed modified intermediate representation from the computing system 690 (e.g., transmitting vehicle computing system, transmitting autonomous vehicle, transmitting infrastructure element, etc.). The compressed modified intermediate representation can be indicative of at least a portion of a secondary environment proximate to the target autonomous vehicle 605. The target autonomous vehicle 605 can also obtain compressed intermediate representations (e.g., messages 640, 650) (e.g., modified or unmodified) from one or more other systems (e.g., other autonomous vehicles 610, 620, etc.).

The target autonomous vehicle 605 (e.g., the one or more devices (e.g., the vehicle computing system) associated with the target autonomous vehicle 605) can generate a first decompressed intermediate representation by decompressing the compressed modified intermediate representations. For instance, the target autonomous vehicle 605 can include a decompressor model that includes a decoder and entropy decoding techniques. The first decompressed intermediate representation can be generated via the application of the decompressor model.

The target autonomous vehicle 605 (e.g., the one or more devices (e.g., the vehicle computing system) associated with the target autonomous vehicle 605) can determine, (at 680), using one or more machine-learned models, an updated intermediate representation based, at least in part, on the first decompressed intermediate representation (e.g., originally generated by the computing system based, at least in part, on the modified intermediate representation) and a second intermediate representation 635 generated by the target autonomous vehicle 605. The second intermediate representation 635 can be generated by the target autonomous vehicle 605 in a manner similar to that previously described with respect to the adverse autonomous vehicle 615 (e.g., but not modified). For example, the target autonomous vehicle 605 can obtain sensor data 625 via one or more sensors of the target autonomous vehicle 605 and determine the second intermediate representation 635 based at least in part on the sensor data 625 obtained via the one or more sensors of the target autonomous vehicle 605 (e.g., by extracting features to create a down sampled spatial feature map).

The updated intermediate representation 680 can be determined, based, at least in part, on a machine-learned aggregation model 685 configured to aggregate a plurality of intermediate representations (e.g., messages 640, 645, 650) from a plurality of autonomous vehicles (e.g., vehicles 610, 615, 620) or other remote devices/systems. The machine-learned aggregation model 685 can include a graph neural network that includes a plurality of nodes. Each node of the graph neural network can correspond to a respective autonomous vehicle (and/or other device/system) of a plurality of autonomous vehicles (and/or other devices/systems) within the environment of the target autonomous vehicle 605. This can include, for example, vehicles within the communication range of the target autonomous vehicle 605. Each respective autonomous vehicle can be associated with a respective set of spatial coordinates, which can be represented by its associated node. One of the nodes can correspond to the computing system 690 (and/or adverse autonomous vehicle 615 associated with the computing system 690).

The machine-learned aggregation model 685 can be configured to transform inputted intermediate representation(s) based at least in part on a set of spatial coordinates associated with the computing system 690. For instance, the machine-learned aggregation model 685 can be configured to initialize a node state of at least one node of the graph neural network and update the node state of the at least one node based at least in part on a spatial transformation. For instance, in the graph neural network, each node can maintain a state representation. At each iteration, messages can be sent between nodes of the graph and the node states for each node can be updated based, at least in part, on the aggregated received information (e.g., of the messages) using a neural network.

The target vehicle computing system can generate an autonomy output 334 for the target autonomous vehicle 605 (e.g., as described herein) based at least in part on the updated intermediate representation 680. The autonomy output 334 can be indicative of a bounding shape associated with an object within the environment of the target autonomous vehicle 605 and one or more predicted future locations of the object. The target autonomous vehicle 605 can utilize the machine-learned model (e.g., a second portion 320B thereof) to generate the autonomy output 334. The target autonomous vehicle 605 can input the updated intermediate representation 680 into the machine-learned model (e.g., portion 320B) and obtain the autonomy output 334 as an output of the machine-learned model. For instance, the target autonomous vehicle 605 can apply a set of four convolutional blocks to extract a high-level representation suitable for a perception and prediction task. The block helps to capture multi-scale context efficiently, which can be helpful for the prediction function. A feature map can be used with two network branches that output detection and motion forecasting estimates respectively. The output of the detection branch can be parameterized as (x, y, w, h, θ), which denotes the position, size and orientation of objects. This can be represented as a bounding shape associated with an object within the environment of the target autonomous vehicle 605. The output of the prediction branch can be parameterized as (xt, yt), which denotes the object's location at future time step t. This can indicate one or more future location(s) of the object. The autonomy output 334 can be indicative of the output of the detection branch and the prediction branch (e.g., a bounding shape 218 and predicted future location(s) 216).

The machine-learned model 630A, 320B can be trained to detect the modified intermediate representations (e.g., representation 660 modified by deviation 670). For example, to defend against an attack posed by the modified intermediate representation(s), the machine-learned model 630A, 320B can be trained via adversarial training techniques. The adversarial training techniques can be applied to any of the model(s) discussed herein. For example, the machine-learned aggregation model 685 can be trained, via adversarial training techniques, to detect modified intermediate representations before generating the updated intermediate representations. In this manner, modified intermediate representations can be discarded before generating the updated intermediate representation.

The machine-learned model(s) of the described system can be trained in several stages. For instance, a sensor backbone (e.g., a first portion, LIDAR backbone for helping to create the intermediate representation) and output headers can be pre-trained on a real-LIDAR single-vehicle dataset, bypassing the cross-vehicle aggregation stage. The loss function can be cross-entropy on a vehicle classification output and smooth 11 on the bounding box parameters. Hard-negative mining can be applied as well to improve performance. The sensor backbone (e.g., LIDAR backbone), cross-vehicle aggregation, and output header models can be jointly fine tuned on a simulated vehicle-to-vehicle dataset (described below) with synchronized inputs (e.g., no time delay) using the same loss function. The training can avoid the use of a temporal warping function at this stage. During training, for every example in the minibatch, the number of connected vehicles can be randomly sampled uniformly on [0,min(c, 6)], where c is the number of candidate vehicles available. This can help ensure that the architecture of the machine-learned model(s) can handle arbitrary graph connectivity while also making sure the fraction of vehicles in the scene/ecosystem on the network remains reasonable. With the main network trained, the compression model can be trained. To do so, the main network (backbone, aggregation, output header) can be fixed since this is reconstructing the decompressed feature map. The compression model can be trained with a rate-distortion objective, which aims to maximize the bit rate in transmission while minimizing the distortion between uncompressed and decompressed data. The rate objective can be defined as the entropy of the transmitted code, and the distortion objective as the reconstruction loss (e.g., between the decompressed and uncompressed feature maps).

Figure 8:
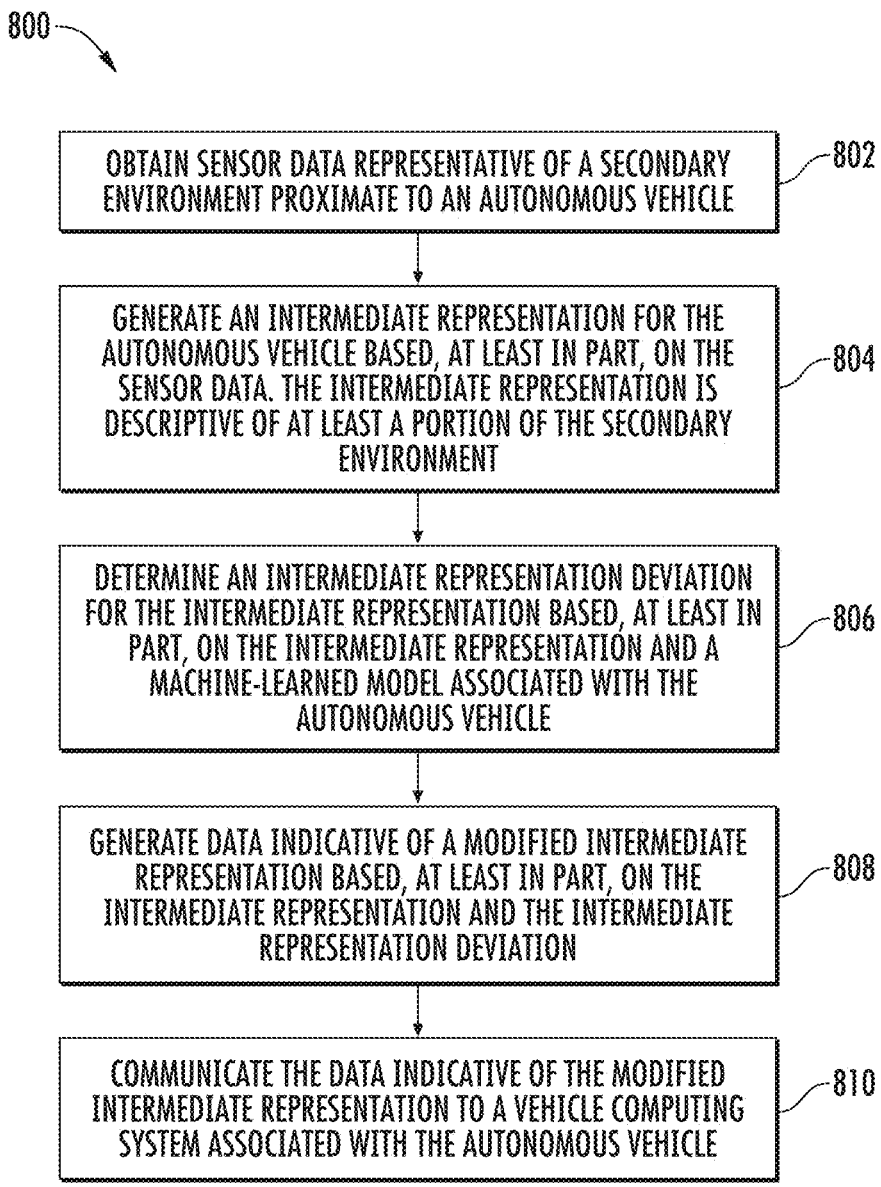
FIG. 8 depicts a flow diagram of a method for determining an intermediate representation deviation according to example embodiments of the present disclosure.

FIG. 8 depicts a flow diagram of a method 800 for determining an intermediate representation deviation according to example embodiments of the present disclosure. One or more portion(s) of the method 800 can be implemented by a computing system that includes one or more computing devices such as, for example, the computing systems described with reference to the other figures (e.g., vehicle computing system 110, operations computing system 190A, remote computing system(s) 190B, computing system 690, transmitter system 302, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-3, 6-7, 10-11, etc.), for example, to determine an intermediate representation deviation. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At (802), the method 800 includes obtaining sensor data representative of a secondary environment proximate to an autonomous vehicle. For example, a computing system (e.g., vehicle computing system 110, operations computing system 190A, remote computing system(s) 190B, computing system 690, transmitter system 302, etc.) can obtain sensor data representative of a secondary environment proximate to an autonomous vehicle.

At (804), the method 800 includes generating an intermediate representation for the autonomous vehicle based, at least in part, on the sensor data. For example, the computing system (e.g., vehicle computing system 110, operations computing system 190A, remote computing system(s) 190B, computing system 690, transmitter system 302, etc.) can generate the intermediate representation for the autonomous vehicle based, at least in part, on the sensor data. The intermediate representation is descriptive of at least a portion of the secondary environment.

At (806), the method 800 includes determining an intermediate representation deviation for the intermediate representation based, at least in part, on the intermediate representation and a machine-learned model associated with the autonomous vehicle. For example, the computing system (e.g., vehicle computing system 110, operations computing system 190A, remote computing system(s) 190B, computing system 690, transmitter system 302, etc.) can determine the intermediate representation deviation for the intermediate representation based, at least in part, on the intermediate representation and the machine-learned model associated with the autonomous vehicle.

At (808), the method 800 includes generating data indicative of a modified intermediate representation based, at least in part, on the intermediate representation and the intermediate representation deviation. For example, the computing system (e.g., vehicle computing system 110, operations computing system 190A, remote computing system(s)

190B, computing system 690, transmitter system 302, etc.) can generate data indicative of a modified intermediate representation based, at least in part, on the intermediate representation and the intermediate representation deviation.

At (810), the method 800 includes communicating the data indicative of the modified intermediate representation to a vehicle computing system associated with the autonomous vehicle. For example, the computing system (e.g., vehicle computing system 110, operations computing system 190A, remote computing system(s) 190B, computing system 690, transmitter system 302, etc.) can communicate the data indicative of the modified intermediate representation to the vehicle computing system associated with the autonomous vehicle.

Figure 9:
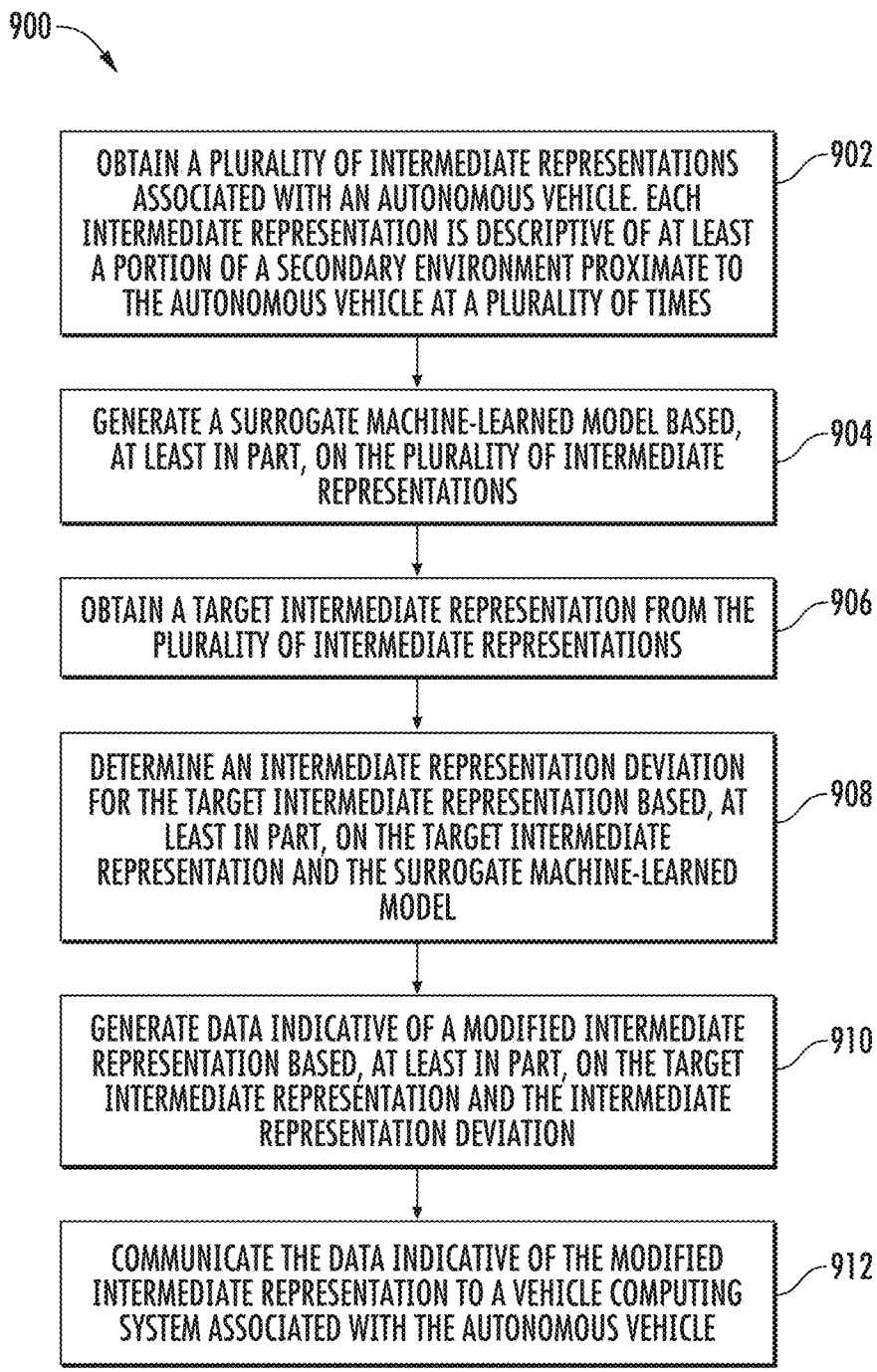
FIG. 9 depicts a flow diagram of another method for determining an intermediate representation deviation according to example embodiments of the present disclosure.

FIG. 9 depicts a flow diagram of another method 900 for determining an intermediate representation deviation according to example embodiments of the present disclosure. One or more portion(s) of the method 900 can be implemented by a computing system that includes one or more computing devices such as, for example, the computing systems described with reference to the other figures (e.g., vehicle computing system 110, operations computing system 190A, remote computing system(s) 190B, computing system 690, transmitter system 302, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1-3, 6-7, 10-11, etc.), for example, to determine an intermediate representation deviation. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At (902), the method 900 includes obtaining a plurality of intermediate representations associated with an autonomous vehicle. For example, a computing system (e.g., vehicle computing system 110, operations computing system 190A, remote computing system(s) 190B, computing system 690, transmitter system 302, etc.) can obtain the plurality of intermediate representations associated with the autonomous vehicle. Each intermediate representation is descriptive of at least a portion of a secondary environment proximate to the autonomous vehicle at a plurality of times.

At (904), the method 900 includes generating a surrogate machine-learned model based, at least in part, on the plurality of intermediate representations. For example, the computing system (e.g., vehicle computing system 110, operations computing system 190A, remote computing system(s) 190B, computing system 690, transmitter system 302, etc.) can generate the surrogate machine-learned model based, at least in part, on the plurality of intermediate representations.

At (906), the method 900 includes obtaining a target intermediate representation from the plurality of intermediate representations. For example, the computing system (e.g., vehicle computing system 110, operations computing system 190A, remote computing system(s) 190B, computing system 690, transmitter system 302, etc.) can obtain the target intermediate representation from the plurality of intermediate representations.

At (908), the method 900 includes determining an intermediate representation deviation for the target intermediate representation based, at least in part, on the target intermediate representation and the surrogate machine-learned model. For example, the computing system (e.g., vehicle computing system 110, operations computing system 190A, remote computing system(s) 190B, computing system 690, transmitter system 302, etc.) can determine the intermediate representation deviation for the target intermediate representation based, at least in part, on the target intermediate representation and the surrogate machine-learned model.

At (910), the method 900 includes generating data indicative of a modified intermediate representation based, at least in part, on the target intermediate representation and the intermediate representation deviation. For example, the computing system (e.g., vehicle computing system 110, operations computing system 190A, remote computing system(s) 190B, computing system 690, transmitter system 302, etc.) can generate data indicative of the modified intermediate representation based, at least in part, on the target intermediate representation and the intermediate representation deviation.

At (912), the method 900 includes communicating the data indicative of the modified intermediate representation to a vehicle computing system associated with the autonomous vehicle. For example, the computing system (e.g., vehicle computing system 110, operations computing system 190A, remote computing system(s) 190B, computing system 690, transmitter system 302, etc.) can communicate the data indicative of the modified intermediate representation to the vehicle computing system associated with the autonomous vehicle.

Figure 10:
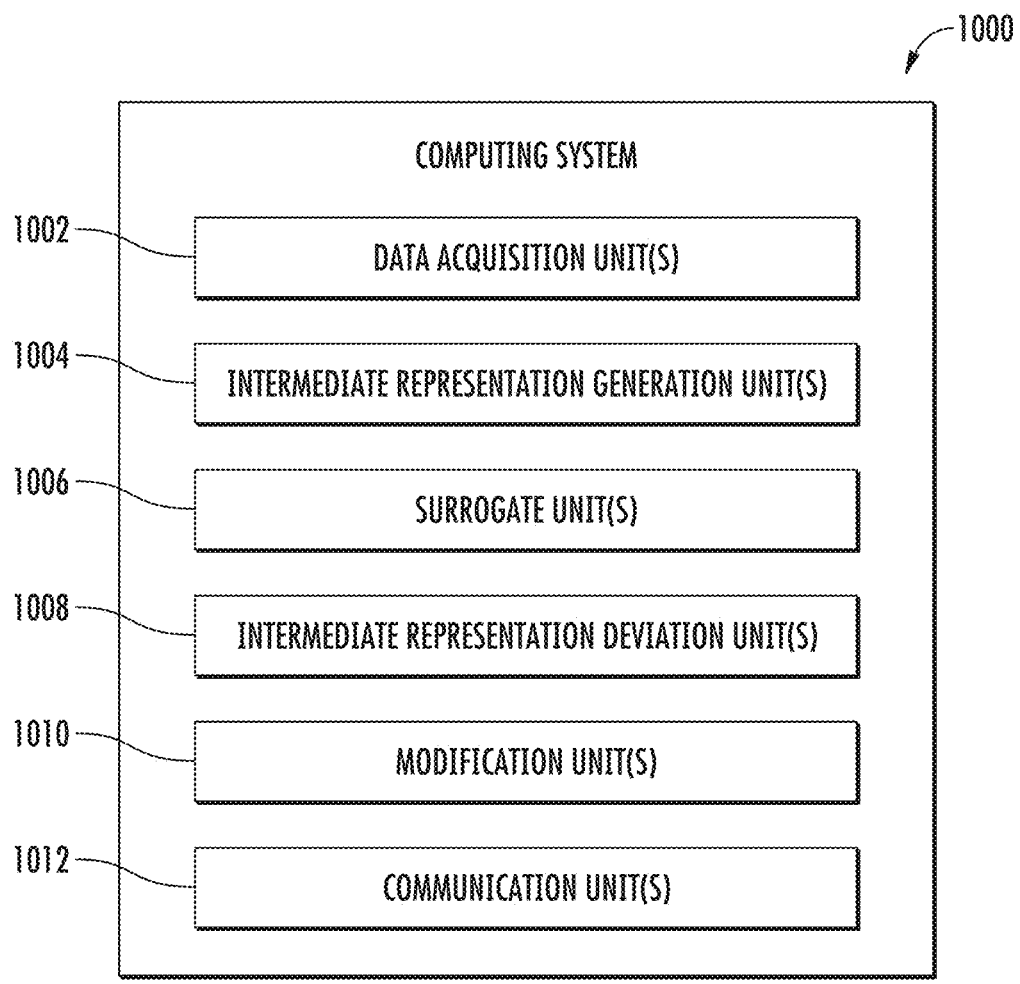
FIG. 10 depicts an example system with various means for performing operations and functions according to example implementations of the present disclosure.

FIG. 10 depicts an example system 1000 with various means for performing operations and functions according to example implementations of the present disclosure. Various means can be configured to perform the methods and processes described herein. For example, a computing system can include data acquisition unit(s) 1002, intermediate representation generation unit(s) 1004, surrogate unit(s) 1006, intermediate representation deviation unit(s) 1008, modification unit(s) 1010, communication unit(s) 1012, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data acquisition unit(s) 1002, etc.) can be configured to obtain sensor data representative of a secondary environment proximate to an autonomous vehicle. In addition, or alternatively, the means (e.g., data acquisition unit(s) 1002, etc.) can be configured to obtain a plurality of intermediate representations associated with an autonomous vehicle. Each intermediate representation can be descriptive of at least a portion of a secondary environment proximate to the autonomous vehicle at a plurality of times. The means (e.g., data acquisition unit(s) 1002, etc.) can be configured to obtain a target intermediate representation from the plurality of intermediate representations.

The means (e.g., surrogate unit(s), etc.) can be configured to generate a surrogate machine-learned model based, at least in part, on the plurality of intermediate representations. The means (e.g., intermediate representation generation unit(s) 1004, etc.) can be configured to generate an intermediate representation for the autonomous vehicle based, at least in part, on the sensor data. The intermediate representation can be descriptive of at least a portion of the secondary environment.

The means (e.g., intermediate representation deviation unit(s) 1008, etc.) can be configured to determine an intermediate representation deviation for the intermediate representation based, at least in part, on the intermediate representation and a machine-learned model associated with the autonomous vehicle. In addition, or alternatively, the means (e.g., intermediate representation deviation unit(s) 1008, etc.) can be configured to determine an intermediate representation deviation for the target intermediate representation based, at least in part, on the target intermediate representation and the surrogate machine-learned model.

The means (e.g., modification unit(s) 1010, etc.) can be configured to generate data indicative of a modified intermediate representation based, at least in part, on the intermediate representation and the intermediate representation deviation. In addition, or alternatively, the means (e.g., modification unit(s) 1010, etc.) can be configured to generate data indicative of a modified intermediate representation based, at least in part, on the target intermediate representation and the intermediate representation deviation. The means (e.g., communication unit(s) 1012, etc.) can be configured to communicate the data indicative of the modified intermediate representation to a vehicle computing system associated with the autonomous vehicle.

Figure 11:
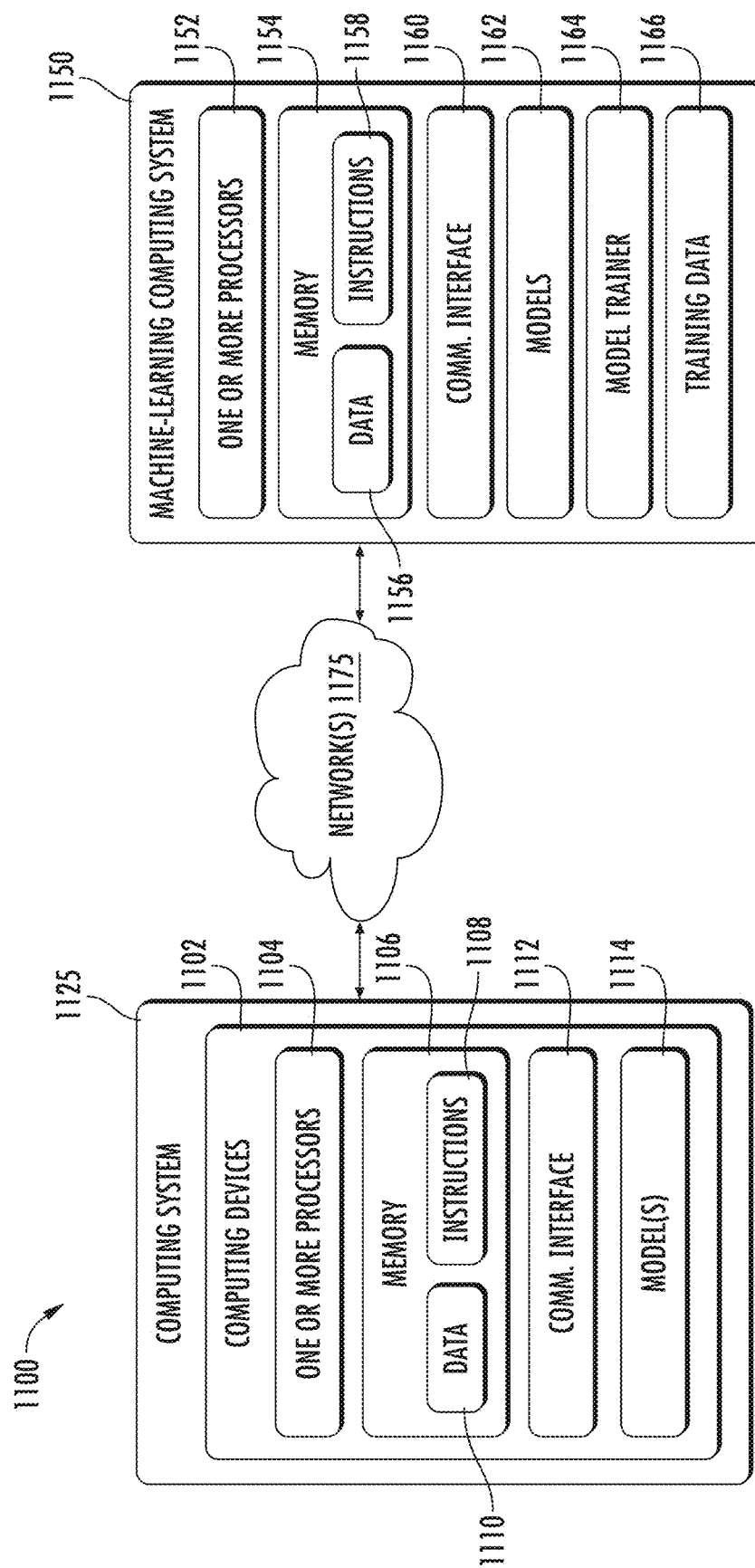
FIG. 11 depicts an example computing system according to example embodiments of the present disclosure.

FIG. 11 depicts an example computing system 1100 according to example embodiments of the present disclosure. The example system 1100 can include the computing system 1125 and a machine learning computing system 1150 that are communicatively coupled over one or more network(s) 1175. As described herein, the computing system 1125 can be implemented onboard a transmitter and/or recipient system such as that of a vehicle (e.g., as a portion of the vehicle computing system) and/or can be remote therefrom (e.g., as portion of an operations computing system). In either case, a vehicle computing system can utilize the operations and model(s) of the computing system 1125 (e.g., locally, via wireless network communication, etc.).

The computing system 1125 can include one or more computing device(s) 1102. The computing device(s) 1102 of the computing system 1125 can include processor(s) 1104 and a memory 1106. The one or more processors 1104 can be any suitable processing device (e.g., a processor core, a microprocessor, an ASIC, a FPGA, a controller, a microcontroller, etc.) and can be one processor or a plurality of processors that are operatively connected. The memory 1106 can include one or more non-transitory computer-readable storage media, such as RAM, ROM, EEPROM, EPROM, one or more memory devices, flash memory devices, etc., and combinations thereof.

The memory 1106 can store information that can be obtained by the one or more processors 1104. For instance, the memory 1106 (e.g., one or more non-transitory computer-readable storage mediums, memory devices) can include computer-readable instructions 1108 that can be executed by the one or more processors 1104. The instructions 1108 can be software written in any suitable programming language or can be implemented in hardware. Additionally, or alternatively, the instructions 1108 can be executed in logically and/or virtually separate threads on processor(s) 1104.

For example, the memory 1106 can store instructions 1108 that when executed by the one or more processors 1104 cause the one or more processors 1104 (the computing system 1125) to perform operations such as any of the operations and functions of a vehicle computing system, transmitter computing system, recipient computing system, target computing system, adverse computing system, and/or for which any of these computing systems are configured such as, for example, to determine, apply, detect, and/or correct modified intermediate representations, as described herein.

The memory 1106 can store data 1110 that can be obtained (e.g., received, accessed, written, manipulated, generated, created, stored, etc.). The data 1110 can include, for instance, sensor data, intermediate representations, representation deviations, modified intermediate representations, autonomy outputs, perception data, prediction data, motion planning data, control signals, models, and/or any other data/information described herein. In some implementations, the computing device(s) 1102 can obtain data from one or more memories that are remote from the computing system 1100.

The computing device(s) 1102 can also include a communication interface 1112 used to communicate with one or more other system(s) (e.g., other systems onboard and/or remote from a vehicle, the other systems of FIG. 11, etc.). The communication interface 1112 can include any circuits, components, software, etc. for communicating via one or more networks 1175. In some implementations, the communication interface 1112 can include, for example, one or more of a communications controller, receiver, transceiver, transmitter, port, conductors, software and/or hardware for communicating data/information.

According to an aspect of the present disclosure, the computing system 1125 can store or include one or more machine-learned models 1114. As examples, the machine-learned models 1114 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, etc.), recurrent neural networks (e.g., long short-term memory recurrent neural networks, etc.), and/or other forms of neural networks. The machine-learned models 1114 can include the machine-learned models of FIGS. 3, 6, and 7 and/or other model(s), as described herein.

In some implementations, the computing system 1125 can receive the one or more machine-learned models 1114 from the machine learning computing system 1150 over the network(s) 1175 and can store the one or more machine-learned models 1114 in the memory 1106 of the computing system 1125. The computing system 1125 can use or otherwise implement the one or more machine-learned models 1114 (e.g., by processor(s) 1104). In particular, the computing system 1125 can implement the machine learned model(s) 1114 to generate modified intermediate environmental representation(s), autonomy output(s), etc.

The machine learning computing system 1150 can include one or more processors 1152 and a memory 1154. The one or more processors 1152 can be any suitable processing device (e.g., a processor core, a microprocessor, an ASIC, a FPGA, a controller, a microcontroller, etc.) and can be one processor or a plurality of processors that are operatively connected. The memory 1154 can include one or more non-transitory computer-readable storage media, such as RAM, ROM, EEPROM, EPROM, one or more memory devices, flash memory devices, etc., and combinations thereof.

The memory 1154 can store information that can be accessed by the one or more processors 1152. For instance, the memory 1154 (e.g., one or more non-transitory computer-readable storage mediums, memory devices) can store data 1156 that can be obtained (e.g., generated, retrieved, received, accessed, written, manipulated, created, stored, etc.). In some implementations, the machine learning computing system 1150 can obtain data from one or more memories that are remote from the machine learning computing system 1150.

The memory 1154 can also store computer-readable instructions 1158 that can be executed by the one or more processors 1152. The instructions 1158 can be software written in any suitable programming language or can be implemented in hardware. Additionally, or alternatively, the instructions 1158 can be executed in logically and/or virtually separate threads on processor(s) 1152. The memory 1154 can store the instructions 1158 that when executed by the one or more processors 1152 cause the one or more processors 1152 to perform operations. The machine learning computing system 1150 can include a communication interface 1160, including devices and/or functions similar to that described with respect to the computing system 1125.

In some implementations, the machine learning computing system 1150 can include one or more server computing devices. If the machine learning computing system 1150 includes multiple server computing devices, such server computing devices can operate according to various computing architectures, including, for example, sequential computing architectures, parallel computing architectures, or some combination thereof.

In addition, or alternatively to the model(s) 1114 at the computing system 1125, the machine learning computing system 1150 can include one or more machine-learned models 1162. As examples, the machine-learned models 1162 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The machine-learned models 1162 can be similar to and/or the same as the machine-learned models 1114, and/or other model(s) described herein.

As an example, the machine learning computing system 1150 can communicate with the computing system 1125 according to a client-server relationship. For example, the machine learning computing system 1150 can implement the machine-learned models 1162 to provide a web service to the computing system 1125 (e.g., including on a vehicle, implemented as a system remote from the vehicle, etc.). For example, the web service can provide machine-learned models to an entity associated with a vehicle; such that the entity can implement the machine-learned model. Thus, machine-learned models 1162 can be located and used at the computing system 1125 (e.g., on the vehicle, at the operations computing system, etc.) and/or the machine-learned models 1162 can be located and used at the machine learning computing system 1150.

In some implementations, the machine learning computing system 1150 and/or the computing system 1125 can train the machine-learned models 1114 and/or 1162 through use of a model trainer 1164. The model trainer 1164 can train the machine-learned models 1114 and/or 1162 using one or more training or learning algorithms. One example training technique is backwards propagation of errors. In some implementations, the model trainer 1164 can perform supervised training techniques using a set of labeled training data. In other implementations, the model trainer 1164 can perform unsupervised training techniques using a set of unlabeled training data. The model trainer 1164 can perform a number of generalization techniques to improve the generalization capability of the models being trained. Generalization techniques include weight decays, dropouts, or other techniques.

The machine-learned model(s) 1114/1162 of the described system can be trained in several stages. For instance, a sensor backbone (e.g., LIDAR backbone for helping to create the intermediate environmental representation) and output headers can be pre-trained on a real-LiDAR single-vehicle dataset, bypassing the cross-vehicle aggregation stage. The loss function can be cross-entropy on a vehicle classification output and smooth l1 on the bounding box parameters. Hard-negative mining can be applied as well to improve performance. The sensor backbone (e.g., LIDAR backbone), cross-vehicle aggregation, and output header models can be jointly fine tuned on a simulated vehicle-to-vehicle dataset with synchronized inputs (e.g., no time delay) using the same loss function. The training can avoid the use of a temporal warping function at this stage. During training, for every example in the minibatch, the number of connected vehicles can be randomly sampled uniformly on [0,min(c, 6)], where c is the number of candidate systems/vehicles available. This can help ensure that the architecture of the machine-learned model(s) 1114/1262 can handle arbitrary graph connectivity while also making sure the fraction of systems/vehicles in the scene/ecosystem on the network remains reasonable.

The model trainer 1164 can train a machine-learned model 1114 and/or 1162 based on a set of training data 1166. The training data 1166 can include a simulated vehicle-to-vehicle dataset that can be created using a sensor simulation system. The sensor simulation system can be included in or separate from machine-learning computing system 1150. The sensor simulation system can use a large catalog of 3D static scenes and dynamic objects that are built upon real-world data collections to provide a set of rich and diverse assets from which to simulate new scenarios. The sensor simulation system can apply raycasting and machine learning to generate a realistic sensor point cloud such as, for example, a LIDAR point cloud. The sensor simulation system can allow for the creation of vehicle-to-vehicle scenes where a percentage of the vehicles are autonomous vehicles and generate realistic sensor data (e.g., LIDAR data) at different vehicle locations.

The simulations can be based on snippets (e.g., 25-second snippets, etc.) of labeled data recorded by a vehicle (e.g., autonomous vehicle) in the real world, which contains temporal tracks of the bounding boxes of all agents in the scene with respect to the recording vehicle. To generate the simulated vehicle-to-vehicle dataset, a real-world snippet can be recreated in a simulated virtual world using these ground-truth tracks. By using the same scenario layouts and agent trajectories recorded from the real world, the simulation system can replicate realistic traffic and vehicle motion for vehicle-to-vehicle dataset generation. At each timestep, actor 3D-assets can be placed into the virtual scene according to real-world labels and generate the sensor data (e.g., LIDAR point cloud data, etc.) at different candidate vehicle locations. Candidate autonomous vehicles can be non-parked vehicles that are within a communication range (e.g., a 50-meter broadcast range) of a subject vehicle in the scene (e.g., the autonomous vehicle that recorded the snippet in the real-world). This data generation approach allows for the generation of more realistic and diverse topologies of vehicle-to-vehicle communication networks.

In some implementations, the training data 1166 can be taken from the same vehicle as that which utilizes the model(s) 1114/1162. In this way, the models 1114/1162 can be trained to determine outputs in a manner that is tailored to that particular system/vehicle. Additionally, or alternatively, the training data 1166 can be taken from one or more different vehicles than that which is utilizing that model 1114/1162. The model trainer 1164 can be implemented in hardware, firmware, and/or software controlling one or more processors.

The network(s) 1175 can be any type of network or combination of networks that allows for communication between devices. In some embodiments, the network(s) 1175 can include one or more of a local area network, wide area network, the Internet, secure network, cellular network, mesh network, peer-to-peer communication link and/or some combination thereof and can include any number of wired or wireless links. Communication over the network(s) 1175 can be accomplished, for instance, via a network interface using any type of protocol, protection scheme, encoding, format, packaging, etc.

FIG. 11 illustrates one example system 1100 that can be used to implement the present disclosure. Other computing systems can be used as well. For example, in some implementations, the computing system 1125 can include the model trainer 1164 and the training dataset 1166. In such implementations, the machine-learned models 1114/1162 can be both trained and used locally at the computing system 1125 (e.g., at a vehicle).

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

It should be understood that each autonomous vehicle within the ecosystem (e.g., within a communication range) can perform the functions of a transmitter autonomous vehicle and the functions of a recipient autonomous vehicle as described above. As such, an autonomous vehicle can not only communicate compressed intermediate environmental representations to other autonomous vehicles but can also receive compressed intermediate environmental representations from other autonomous vehicles. In some implementations, the autonomous vehicle(s) can also, or alternatively, send and receive autonomy outputs (e.g., of the joint perception/prediction model) among one another.

What is claimed is:

1. A computer-implemented method, the method comprising:
   obtaining sensor data representative of a secondary environment proximate to an autonomous vehicle;
   generating an intermediate representation for the autonomous vehicle based, at least in part, on the sensor data, wherein the intermediate representation is descriptive of at least a portion of the secondary environment;
   determining an intermediate representation deviation for the intermediate representation based, at least in part, on the intermediate representation and a machine-learned model associated with the autonomous vehicle, by:
      obtaining, via the machine-learned model, one or more ground truth bounding box proposals based, at least in part, on the intermediate representation,
      obtaining, via the machine-learned model, one or more deviating bounding box proposals, and
      determining the intermediate representation deviation for the intermediate representation based, at least in part, on a comparison between the one or more ground truth bound box proposals and the one or more deviating bounding box proposals;
   generating data indicative of a modified intermediate representation based, at least in part, on the intermediate representation and the intermediate representation deviation; and
   communicating the data indicative of the modified intermediate representation to a vehicle computing system associated with the autonomous vehicle.

2. The computer-implemented method of claim 1, wherein the machine-learned model associated with the autonomous vehicle comprises a machine-learned model utilized by the vehicle computing system to detect one or more objects within a surrounding environment of the autonomous vehicle.

3. The computer-implemented method of claim 2, wherein the machine-learned model is configured to output one or more bounding box proposals indicative of one or more objects within the surrounding environment of the autonomous vehicle based, at least in part, on one or more intermediate representations.

4. The computer-implemented method of claim 1, wherein the intermediate representation deviation is based at least in part on an adversarial loss.

5. The computer-implemented method of claim 4, wherein modifying the intermediate representation deviation for the intermediate representation based, at least in part, on the comparison between the one or more ground truth bound box proposals and the one or more deviating bounding box proposals comprise:
  determining the adversarial loss for the intermediate representation deviation based, at least in part, on the one or more ground truth bound box proposals and the one or more deviating bounding box proposals; and
  modifying the intermediate representation deviation based, at least in part, on the adversarial loss, wherein the intermediate representation deviation is modified to minimize the adversarial loss over the one or more deviating bounding box proposals.

6. The computer-implemented method of claim 5, wherein each respective ground truth bounding box proposal of the one or more ground truth bounding box proposals comprises a respective ground truth class score indicative of respective ground truth object classification and one or more respective ground truth bounding box parameters indicative of a respective ground truth spatial location and one or more respective ground truth dimensions of the respective ground truth object classification, and
  wherein each respective deviating bounding box proposal of the one or more respective deviating bounding box proposals comprises a respective deviating class score indicative of a respective deviating object classification and one or more respective deviating bounding box parameters indicative of a respective deviating spatial location and one or more respective deviating dimensions of the respective deviating object classification.

7. The computer-implemented method of claim 6, wherein the adversarial loss is determined based, at least in part, on a difference between a ground truth class score corresponding to at least one ground truth bounding box proposal and a deviating class score corresponding to a deviating bounding box proposal corresponding to the at least one ground truth bounding box proposal.

8. The computer-implemented method of claim 6, wherein the adversarial loss is determined based, at least in part, on a difference between one or more ground truth bounding box parameters corresponding to at least one ground truth bounding box proposal and one or more deviating bounding box parameters corresponding to a deviating bounding box proposal corresponding to the at least one ground truth bounding box proposal.

9. The computer-implemented method of claim 4, wherein the computing system is onboard a transmitting autonomous vehicle physically located proximate to the autonomous vehicle, and wherein the intermediate representation deviation is associated with a first time.

10. The computer-implemented method of claim 9, further comprising:
  obtaining movement data indicative of a motion of the transmitting autonomous vehicle from the first time to a second time;
  obtaining second sensor data representative of the secondary environment proximate to the autonomous vehicle at the second time;
  generating a second intermediate representation for the autonomous vehicle based, at least in part, on the second sensor data; and
  determining a second intermediate representation deviation for the second intermediate representation based, at least in part, on the intermediate representation deviation associated with the first time and the movement data.

11. A computing system comprising:
  one or more processors; and
  one or more non-transitory computer-readable media that collectively store instructions that, when executed by the one or more processors, cause the system to perform operations, the operations comprising:
  obtaining a plurality of intermediate representations associated with an autonomous vehicle, wherein each intermediate representation is descriptive of at least a portion of a secondary environment proximate to the autonomous vehicle at a plurality of times;
  generating a surrogate machine-learned model based, at least in part, on the plurality of intermediate representations;
  obtaining a target intermediate representation from the plurality of intermediate representations;
  determining an intermediate representation deviation for the target intermediate representation based, at least in part, on the target intermediate representation and the surrogate machine-learned model by:
    obtaining, via the surrogate machine-learned model, one or more ground truth bounding box proposals based, at least in part, on the target intermediate representation,
    obtaining, via the surrogate machine-learned model, one or more deviating bounding box proposals, and
    determining the intermediate representation deviation for the target intermediate representation based, at least in part, on a comparison between the one or more ground truth bound box proposals and the one or more deviating bounding box proposals;
  generating data indicative of a modified intermediate representation based, at least in part, on the target intermediate representation and the intermediate representation deviation; and
  communicating the data indicative of the modified intermediate representation to a vehicle computing system associated with the autonomous vehicle.

12. The computing system of claim 11, wherein each intermediate representation of the plurality of intermediate representations is generated by a first portion of a machine-learned model associated with the autonomous vehicle, and wherein a first portion of the surrogate machine-learned model is trained to output a surrogate intermediate representation, wherein the surrogate intermediate representation comprises one or more similarities to the plurality of intermediate representations.

13. The computing system of claim 11, wherein generating the surrogate machine-learned model based, at least in part, on the plurality of intermediate representations comprises:
  obtaining sensor data representative of surrogate environment proximate to the autonomous vehicle; and
  generating the surrogate machine-learned model based, at least in part, on the plurality of intermediate representations and the sensor data.

14. The computing system of claim 13, wherein generating the surrogate machine-learned model based, at least in part, on the plurality of intermediate representations further comprises:
  generating, via a first portion of the surrogate machine-learned model, a surrogate intermediate representation based, at least in part, on the sensor data;
  generating, via a machine-learned discriminator model, a discriminator loss based, at least in part, on the surrogate intermediate representation and at least one of the plurality of intermediate representations; and
  training the surrogate machine-learned model to minimize the discriminator loss.

15. The computing system of claim 14, wherein the discriminator loss is indicative of a difference between the surrogate intermediate representation and the at least one intermediate representation.

16. The computing system of claim 11, wherein a second portion of the surrogate machine-learned model is configured to output one or more bounding box proposals indicative of one or more objects within the secondary environment proximate to the autonomous vehicle based, at least in part, on the target intermediate representation.

17. The computing system of claim 16, wherein the intermediate representation deviation is based at least in part on an adversarial loss.

18. An autonomous vehicle comprising:
  one or more sensors;
  one or more processors; and
  one or more tangible, non-transitory, computer readable media that collectively store instructions that when executed by the one or more processors cause the one or more processors to perform operations, the operations comprising:
    obtaining, via the one or more sensors, sensor data representative of a surrounding environment of the autonomous vehicle;
    generating, via a first portion of a machine-learned model, an intermediate representation based, at least in part, on the sensor data, wherein the intermediate representation is descriptive of at least a portion of the surrounding environment of the autonomous vehicle;
    determining an intermediate representation deviation for the intermediate representation based, at least in part, on the intermediate representation and the machine-learned model, by:
      obtaining, via the machine-learned model, one or more ground truth bounding box proposals based, at least in part, on the intermediate representation,
      obtaining, via the machine-learned model, one or more deviating bounding box proposals, and
      determining the intermediate representation deviation for the intermediate representation based, at least in part, on a comparison between the one or more ground truth bound box proposals and the one or more deviating bounding box proposals;
    generating, data indicative of a modified intermediate representation based, at least in part, on the intermediate representation and the intermediate representation deviation; and
    communicating the data indicative of the modified intermediate representation to one or more devices associated with a target autonomous vehicle.

19. The autonomous vehicle of claim 18, wherein the target autonomous vehicle is configured to utilize a second portion of the machine-learned model to detect one or more objects within a surrounding environment of the target autonomous vehicle.

20. The autonomous vehicle of claim 18, wherein the machine-learned model is trained to detect the modified intermediate representation.

* * * * *